United States Patent
Jin

(10) Patent No.: US 8,178,165 B2
(45) Date of Patent: May 15, 2012

(54) METHOD FOR FABRICATING A LONG-RANGE ORDERED PERIODIC ARRAY OF NANO-FEATURES, AND ARTICLES COMPRISING SAME

(75) Inventor: Sungho Jin, San Diego, CA (US)

(73) Assignee: The Regents of the University of California, La Jolla, CA (US)

( * ) Notice: Subject to any disclaimer, the term of this patent is extended or adjusted under 35 U.S.C. 154(b) by 978 days.

(21) Appl. No.: 11/814,338

(22) PCT Filed: Jan. 23, 2006

(86) PCT No.: PCT/US2006/002122
§ 371 (c)(1),
(2), (4) Date: Jun. 24, 2008

(87) PCT Pub. No.: WO2006/078952
PCT Pub. Date: Jul. 27, 2006

(65) Prior Publication Data
US 2008/0260941 A1   Oct. 23, 2008

Related U.S. Application Data

(60) Provisional application No. 60/645,770, filed on Jan. 21, 2005.

(51) Int. Cl.
*B05D 5/00* (2006.01)
*B05D 3/00* (2006.01)

(52) U.S. Cl. ........ 427/287; 427/256; 427/532; 427/541; 427/542; 427/543; 427/331; 427/346; 427/347; 427/457; 977/855; 977/858; 977/849

(58) Field of Classification Search .................. 427/256, 427/287, 541, 542, 532, 346, 347; 977/855, 977/858
See application file for complete search history.

(56) References Cited

U.S. PATENT DOCUMENTS

| 5,159,513 A | 10/1992 | Dieny et al. |
| 5,576,914 A | 11/1996 | Rottmayer et al. |
| 5,587,223 A | 12/1996 | White |

(Continued)

OTHER PUBLICATIONS

Deng et al., "Two-Dimensional Block Copolymer Photonic Crystals", Polymer, vol. 44, (2003), pp. 6549-6553.*

(Continued)

*Primary Examiner* — Nathan Empie
*Assistant Examiner* — Lisha Jiang
(74) *Attorney, Agent, or Firm* — Lowenstein Sandler PC

(57) ABSTRACT

A long range, periodically ordered array of discrete nano-features (10), such as nano-islands, nano-particles, nano-wires, non-tubes, nano-pores, nano-composition-variations, and nano-device-components, are fabricated by propagation of a self-assembling array or nucleation and growth of periodically aligned nano-features. The propagation may be induced by a laterally or circularly moving heat source, a stationary heat source arranged at an edge of the material to be patterned (12), or a series of sequentially activated heaters or electrodes. Advantageously, the long-range periodic array of nano-features (10) may be utilized as a nano-mask or nano-implant master pattern for nano-fabrication of other nano-structures. In addition, the inventive long-range, periodically ordered arrays of nano-features are useful in a variety of nanoscale applications such as addressable memories or logic devices, ultra-high-density magnetic recording media, magnetic sensors, photonic devices, quantum computing devices, quantum luminescent devices, and efficient catalytic devices.

8 Claims, 20 Drawing Sheets

U.S. PATENT DOCUMENTS

| | | | |
|---|---|---|---|
| 5,668,689 | A | 9/1997 | Schultz et al. |
| 5,820,769 | A | 10/1998 | Chou |
| 6,081,408 | A | 6/2000 | Partee |
| 6,132,491 | A | 10/2000 | Wai et al. |
| 6,280,813 | B1 | 8/2001 | Carey et al. |
| 6,356,420 | B1 | 3/2002 | Everitt |
| 6,440,520 | B1 | 8/2002 | Baglin et al. |
| 7,189,435 | B2 | 3/2007 | Tuominen et al. |
| 2003/0096104 | A1 | 5/2003 | Tobita et al. |
| 2003/0175462 | A1 | 9/2003 | Nishino et al. |
| 2004/0210289 | A1 | 10/2004 | Wang et al. |
| 2005/0100660 | A1* | 5/2005 | Ito et al. .................. 427/66 |

OTHER PUBLICATIONS

Hashimoto et al., "The Effect of Temperature Gradient on the Microdomain Orientation of Diblock Copolymers Undergoing an Order-Disorder Transition", Macromolecules, vol. 32, (1999), pp. 952-954.*

Kralchevsky et al., "Capillary Forces and Structuring in Layers of Colloid Particles", Current Opinion in Colloid & Interface Science, vol. 6, (2001), pp. 383-401.*

Kim et al., "Highly Oriented and Ordered Arrays from Block Copolymers via Solvent Evaporation", Langmuir, vol. 16, (2004), pp. 226-231.*

Hu et al., "Growth of Well-Aligned Carbon Nanotube Arrays on Silicon Substrates using Porous Alumina Film as a Nanotemplate", Applied Physics Letters, vol. 79 No. 19, (Nov. 2001), pp. 3083-3085.*

Masuda et al., "Self-Assembly Patterning of Colloidal Crystals Constructed from Opal Structure or NaCl Structure", Langmuir, vol. 20, (2004), pp. 5588-5592.*

Prevo et al., "Controlled, Rapid Deposition of Structured Coatings from Micro- and Nanoparticle Suspensions", Langmuir, vol. 20, (Feb. 11, 2004), pp. 2099-2107.*

Colvin et al., "From Opals to Optics: Colloidal Photonic Crystals", MRS Bulletin, (2001), pp. 637-641.*

C.A. Ross et al., "Micromagnetic Behavior of Electrodeposited Cylinder Arrays," Phys. Rev., vol. 65, pp. 144417-1-144417-8 (2002).

H. Zeng et al., "Magnetic Properties of Self-Assembled Co Nanowires of Varying Length and Diameter," Journal of Appl, Physics, vol. 87, No. 9, pp. 4718-4720 (2000).

Y. Peng et al., "Magnetic Properties and Magnetization Reversal of Alpha-Iron Nanowires Deposited in Alumina Film," Journal of Appl. Physics, vol. 87, No. 10, pp. 7405-7408 (2000).

M. Terrones et al., "Advances in the Creation of Filled Nanotubes and Novel Nanowires," MRS Bulletin, Aug. 1999, pp. 43-49 (1999).

X. Ye et al., "Supercritical Fluid Fabrication of Metal Nanowires and Nanorods Tremplated by Multiwalled Carbon Nanotubes," Advanced Materials, vol. 15, No. 4, pp. 316-319 (2003).

A. Govindaraj et al., "Metal Nanowires and Intercalated Metal Layers in Single-Walled Carbon Nanotube Bundles," Chem. Matter., vol. 12, pp. 202-205 (2000).

B. Pradhan et al., "Nickel Nanowires of 4 nm Diameter in the Cavity of Carbon Nanotubes," Chem. Commun., Issue 14, pp. 1317-1318 (1999).

S. Liu et al., "Preparation and Characteristics of Carbon Nanotubes Filled with Cobalt," Chem. Mater., vol. 12, pp. 2205-2211 (2000).

* cited by examiner

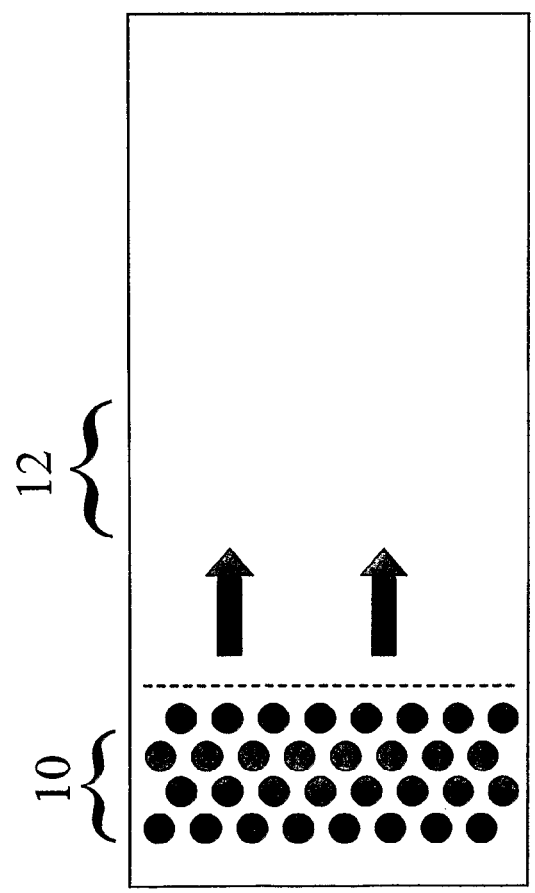
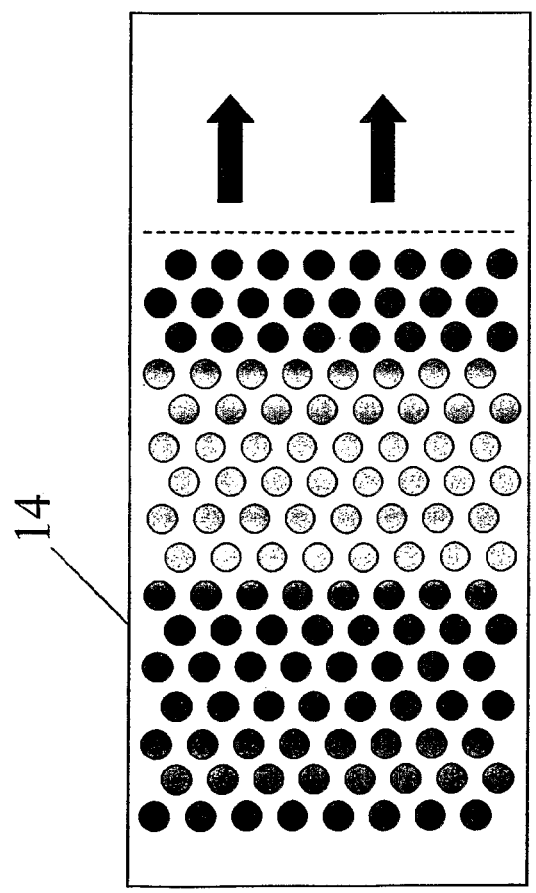

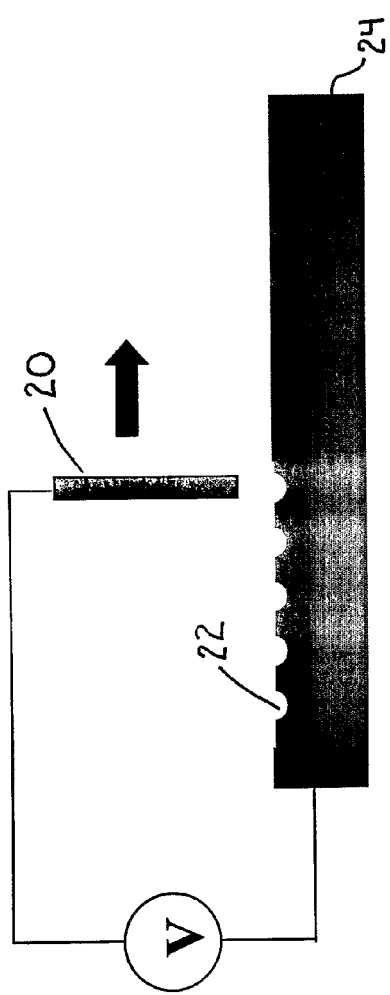
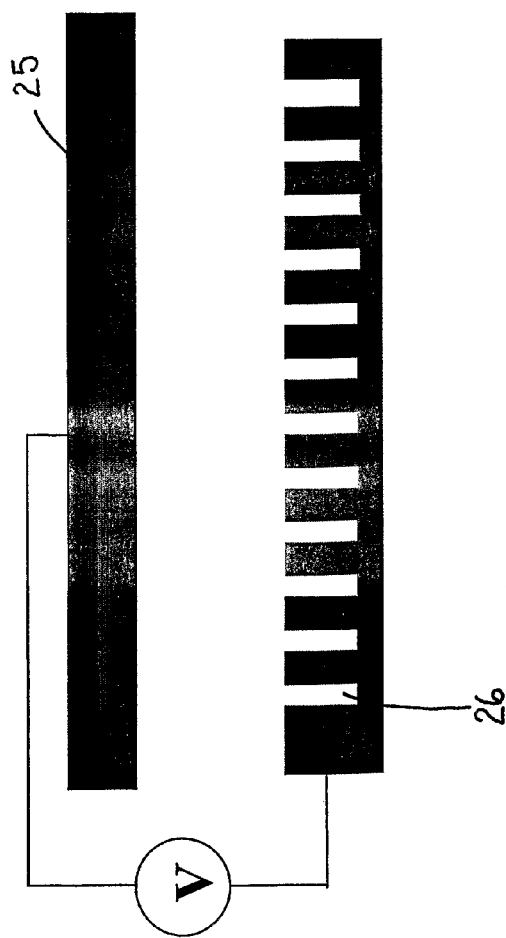

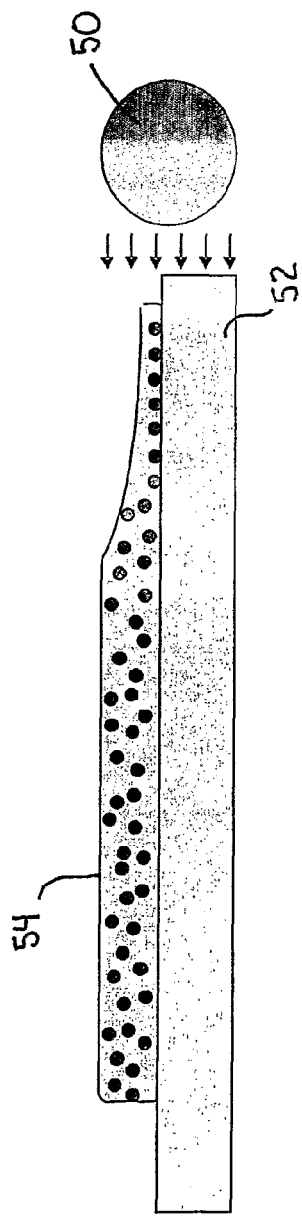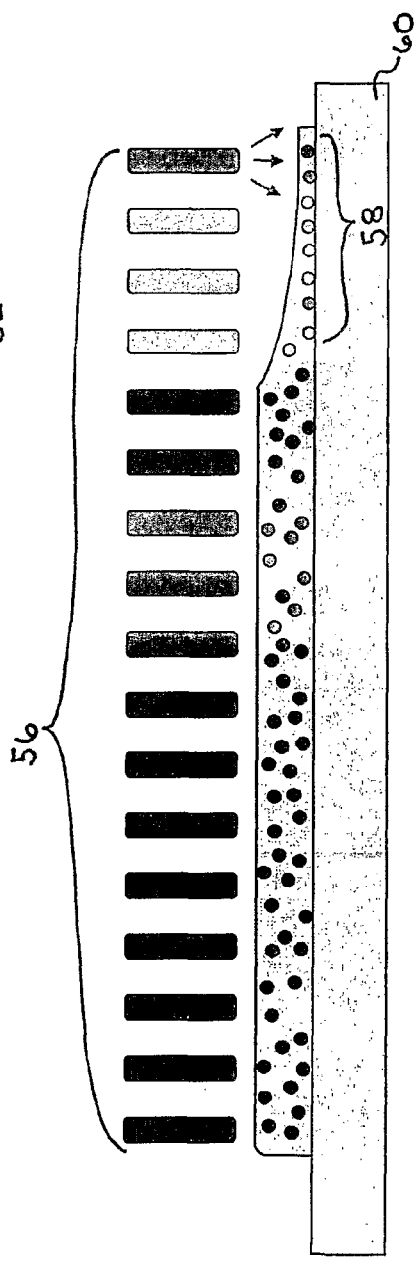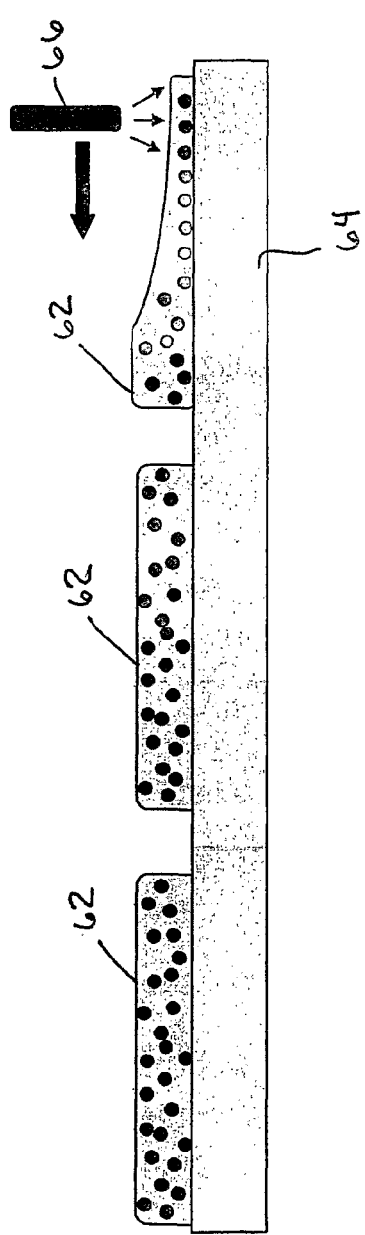

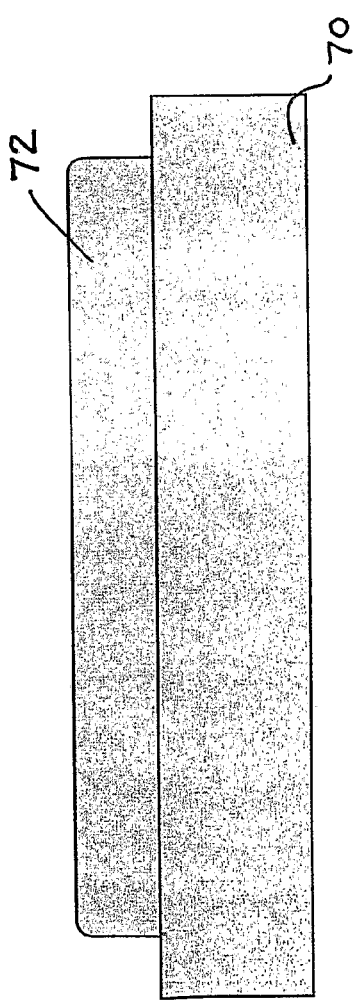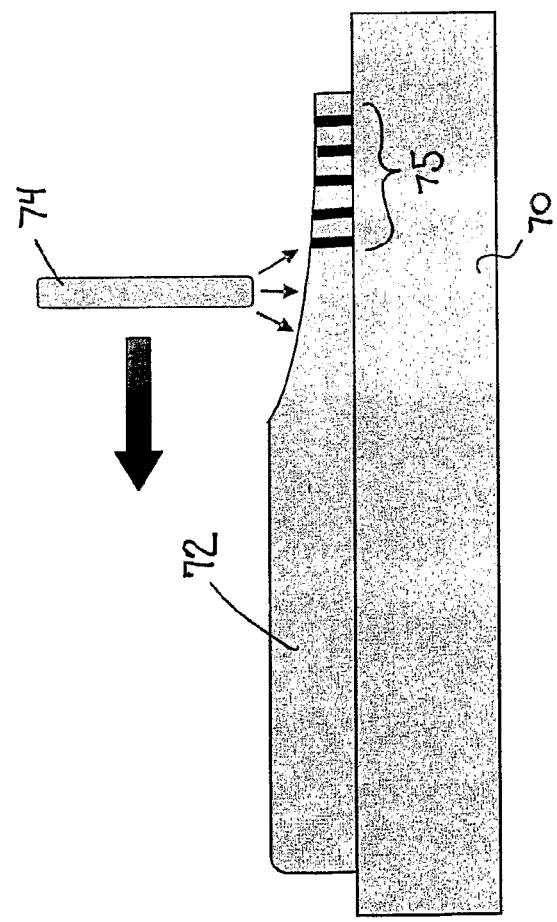

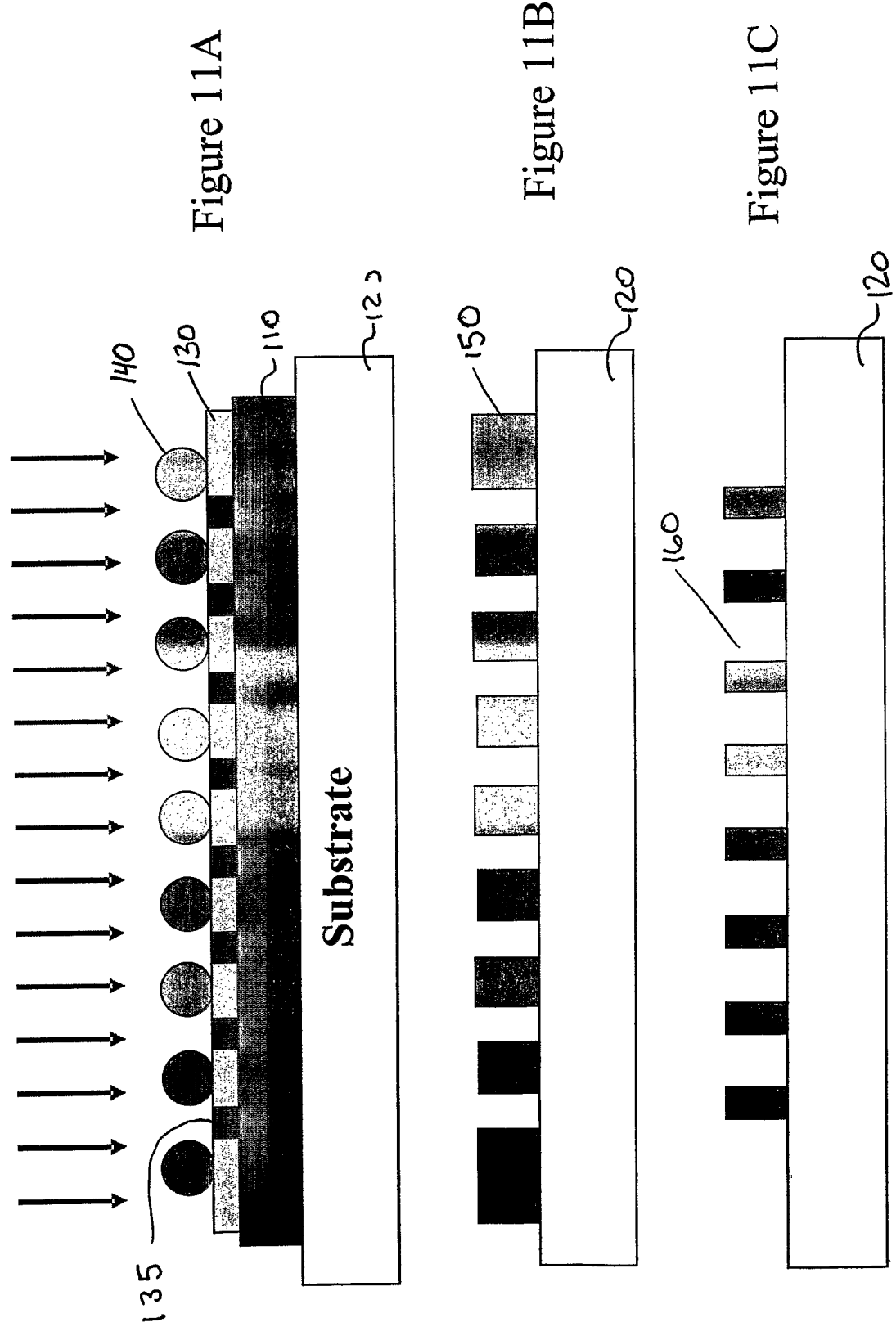

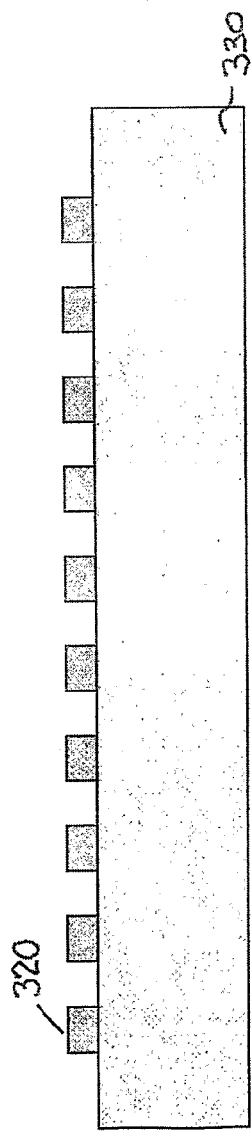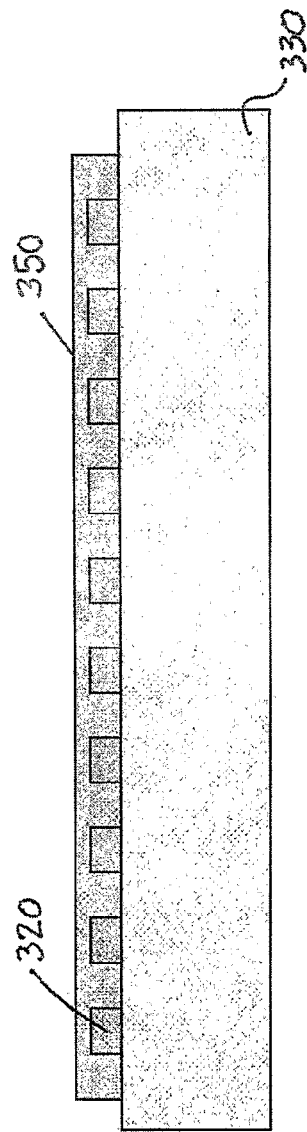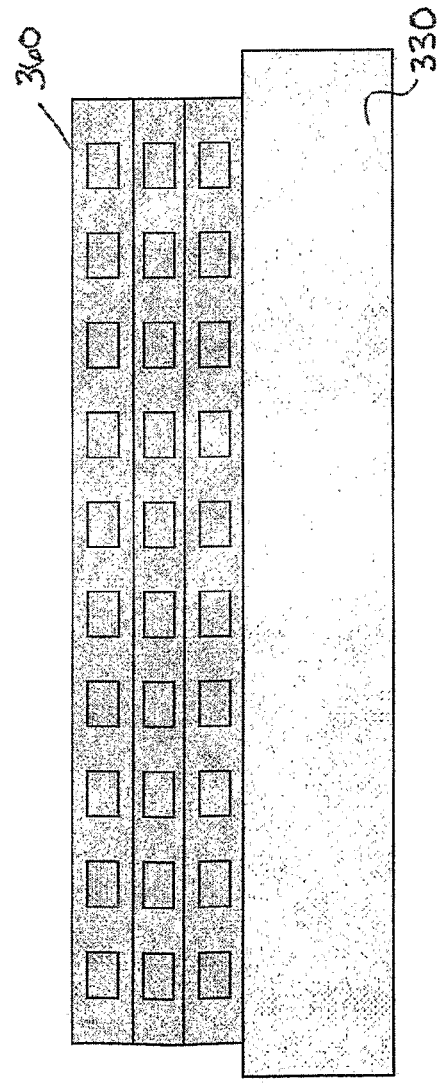

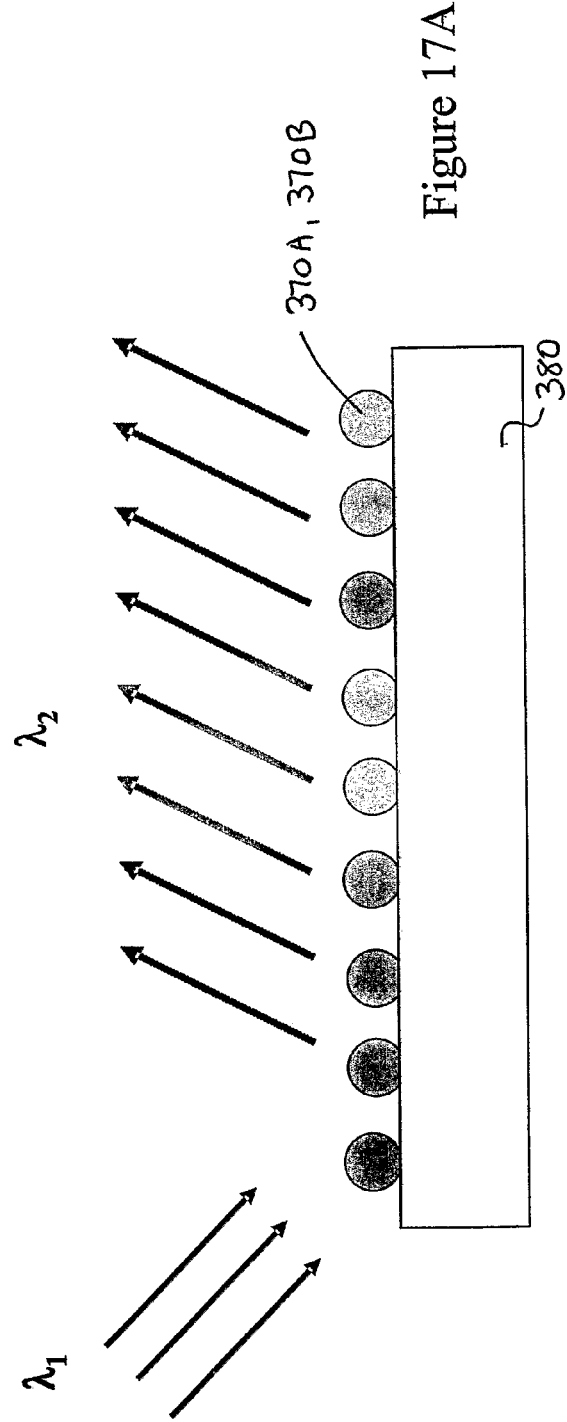
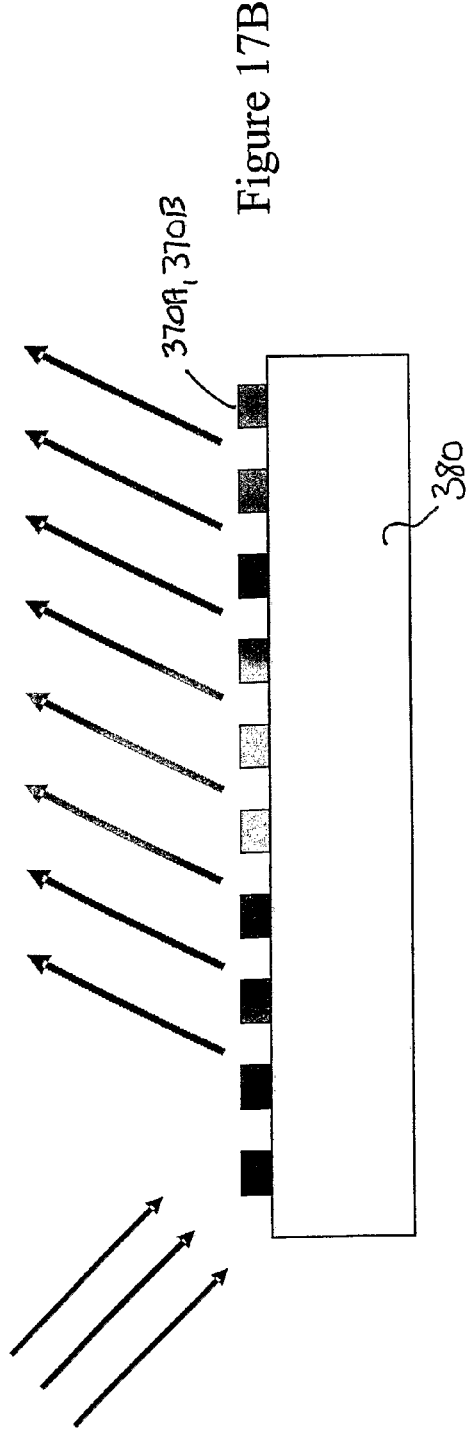

METHOD FOR FABRICATING A LONG-RANGE ORDERED PERIODIC ARRAY OF NANO-FEATURES, AND ARTICLES COMPRISING SAME

CROSS-REFERENCE TO RELATED APPLICATIONS

This application is a U.S. National Stage Application of PCT International Application No. PCT/US2006/002122, filed on Jan. 23, 2006, which in turn claims the benefit of U.S. Provisional Application Ser. No. 60/645,770, filed Jan. 21, 2005. U.S. patent application Ser. No. 60/645,770 and PCT Application No. PCT/US2006/002122 are incorporated by reference herein.

FIELD OF THE INVENTION

This invention relates to nanotechnology, particularly the formation of a periodic array of nano-features.

BACKGROUND OF THE INVENTION

Periodic arrays of nano-features, such as a nano-islands, nano-rods, and nano-cavities, are useful as a basis of a variety of nano-devices, including electronic, acoustic, photonic, and magnetic devices. Examples of such devices include quantum dot or single electron transistor array, photonic bandgap structures, non-linear acoustic devices, and ultra-high-density information storage media (e.g., magnetic recording media and phase change recording media).

Conventional photolithography and laser lithography are widely used for the fabrication of periodic arrays of features having a diameter of larger than approximately 50 nanometers (nm). However, arrays of nano-features with a less than 50 nm feature size are difficult to fabricate with known lithography techniques. Specifically, arrays having sub 50 nm nano-features fabricated according to conventional methods generally include interference and noise caused by the interaction between adjacent nano-features.

One conventional fabrication technique involves the use of nanoscale, naturally occurring periodic-structured nano-templates, such as anodized aluminum oxide membranes, as a host for the preparation of a new nano-feature array. Anodized aluminum oxide (AAO) membranes are prepared by anodic oxidation of aluminum metal in an acidic electrolyte such as sulfuric acid, and exhibits a packed, uniform hexagonal array of vertical channels (nano-pores), with the hole diameter of typically 50-500 nm. The diameter and spacing of the nano-pores in AAO depends on certain processing conditions, such as the nature of the anodizing electrolyte used, the anodizing voltage applied, and/or the processing time and temperature.

The AAO membrane has been used as a matrix material to fill the vertical nano-channels with other metals or alloys (e.g., by electrodeposition) for fabrication of many different types of nano-composites and nano-wires. If desired, a selective dissolution of the aluminum oxide matrix by alkaline solution, such as NaOH, may be used to release the metallic nano-wires.

Another conventional approach to nano-feature fabrication involves using a colloidal material comprising a host material (e.g., a surfactant type polymer matrix such as trioctylphosphine oxide or oleic acid) including inorganic nano-particles (e.g., quantum dots or magnetic particles), which self-assembles into a periodic array of nano-particles as the solvent dries. According to this method, the nano-particles are geometrically constrained by the surfactant molecules such that a self-assembled periodic array of nano-particles is formed within the surfactant material.

However, processes such as those involving surfactant-mediated periodic ordering based on the evaporation of carrier solvent (e.g., hexane or octane) in a colloidal mixture including nano-particles (e.g., Co or $Fe_2O_3$ nano-particles) and a surfactant (e.g., fatty acids such as oleic acid, oleylamine, hexanoic acid, hexylamine) often suffer from the problem of multiple nucleation and growth of ordering reactions, which leads to non-ordered patterning.

Yet another exemplary nano-structure fabrication technique involves the use of a co-polymer material (e.g., a phase-decomposed and processed diblock copolymer film) as a host material. Nano-pores prepared in the diblock copolymer films may be filled with metals, alloys, or other materials to synthesize nano-composites, nano-islands, and/or nano-wires. The dimension of the ordered nano-pores in the diblock copolymer is generally much smaller than that for the AAO-type membranes.

However, a major drawback to the above-identified techniques is that the periodic arrays of nano-islands or nano-rods that may be formed are often very small in area, e.g., several micrometers. For many electronic, optical, and magnetic products, it is necessary to have a long-range array of periodic elements, on the order of millimeters or centimeters.

For example, according to some conventional fabrication methods, periodically aligned regions nucleate and grow randomly (non-periodically) from numerous locations on a substrate surface, as illustrated in FIG. 1. As shown in FIG. 2, this results in short-range ordered structures having ordered regions formed in discrete domains. As these domains grow, they meet and form boundaries. In this non-periodically arranged structure, these domain boundaries are defective regions, where some of the nano-elements (e.g., nano-islands, nano-particles, and nano-cavities) are mis-registered or missing. As such, short-range ordered structures including an plurality of domains and domain boundaries may not be used in applications that include an array of nano-scale devices, such as, for example, an X-Y array of memory elements or logic elements and/or a nano-patterned magnetic recording media comprising an array of nano-scale devices, for example, an X-Y array of memory elements or logic elements, nano-patterned magnetic recording media. For example, in the case of AAO membranes with an array of vertical holes, each of the domains with near-perfect periodic arrangement are typically only several micrometers in area.

The non-periodic arrangement of such memory devices, logic devices, and/or information bits increases the total number of device defects and reduces the effectiveness and usefulness of the nano-patterned device array. For example, a non-periodic arrangement may cause undesirable electrical shorts, capacitive interactions, noises, and/or interference with neighboring elements. In the case of magnetic hard disc media, undesirable switching or read error of magnetically written bits (magnetized along a desired direction) may occur if the neighboring magnetic islands are spaced too close together when the moving read/write head passes by the magnetic bits to retrieve the written information.

X-Y addressable memories or logic devices desirably contain a periodic array of elements which perform a variety of functions. Some examples of X-Y addressable functions include, for example: i) electrical functions such as in RRAM (resistive random access memory dependent on change of electrical resistance in the elements by X-Y addressing with voltage or current pulses which introduce either amorphous-crystalline phase change or interface electrical resistance change); ii) electric charge-storing functions, e.g., flash memory using storage of electrical charge in floating gate elements; iii) electrical switching functions such as quantum computing quantum dot array, single electron transistor array, and tunnel junction array; iv) optical functions, e.g., magneto-optical memory using laser beam writing/reading in combination with magnetic switching, phase change material with altered optical properties induced by laser pulse heating, or quantum-dot regime luminescent devices; and v) magneto-electric functions, e.g., MRAM (magnetic random access memory). If the elements in the X-Y matrix array of devices are arranged in a non-periodic configuration, the device elements may be mis-registered with respect to the X-Y conductor array lines, causing the device to function in a undesirable manner.

Therefore, there is a need in the art for a method of fabricating a long-range order of periodically arranged nano-features, such as, for example, nano-islands, nano-particles, nano-pores, nano-compositional modifications, and/or nano-device elements).

SUMMARY OF THE INVENTION

The above-described problems are addressed and a technical solution is achieved in the art by a method for fabrication of long-range, periodic arrays of nano-features, and devices comprising same. According to an embodiment of the present invention, the method provides for the fabrication of a periodic array of features having a predictable arrangement with uniform spacing between the nano-features.

According to an embodiment of the present invention, periodic arrays of nano-features including, but not limited to nano-structures, nano-islands, nano-particles, nano-wires, nano-tubes, nano-pores, nano-composites, and nano-device-components are fabricated by propagating a self-organized array of laterally moving electrodes which induce laterally propagating nucleation and growth of periodically aligned nano-elements.

According to an embodiment of the present invention, a circular arrangement of such a nano-structure array is also disclosed.

According to an embodiment of the present invention, the long-range periodic array of nano-features fabricated according to the present invention may be used as nano-masks for the fabrication of other types of nano-features, including but not limited to nano-structures and nano-compositional variations.

The inventive long-range, periodically ordered arrays of nano-features may be used in a variety of applications and nano-scale devices, including, but not limited to nano-implant master patterns, an array of addressable memories or logic devices, ultra-high-density magnetic recording media, magnetic sensors, photonic devices, quantum computing devices, quantum luminescent devices, and efficient catalytic devices.

BRIEF DESCRIPTION OF THE DRAWINGS

The present invention will be more readily understood from the detailed description of exemplary embodiments presented below considered in conjunction with the attached drawings, of which:

FIGS. 3A and 3B illustrates steps of an exemplary fabrication process involving the propagation of an actuator over a material to be ordered, according to an embodiment of the present invention;

FIGS. 5A and 5B illustrate steps of an exemplary fabrication process using sweeping electrode movement for electrochemical anodizing reactions, according to an embodiment of the present invention;

FIGS. 7A-7C illustrate methods for producing a surfactant-mediated long-range ordered periodic array of nano-particles using a temperature gradient propagating from a sideway, stationary heat source, by using an array of narrow band heaters which are sequentially activated to provide laterally moving heat, using a subdivided regions of colloidal solution, respectively;

FIGS. 8A-8B illustrate steps of an exemplary method of creating a long-range ordered periodically aligned nanoscale phase decomposition in a diblock co-polymer film using laterally sweeping band of heat source, according to an embodiment of the present invention;

FIGS. 11A-11C illustrate an exemplary method of fabricating an ultra-high-density, patterned nano-structure by utilizing a long-range ordered planar nano-particle array as a nano-mask for lithographic definition of nano-structures, according to an embodiment of the present invention;

FIG. 16A-16C illustrate an exemplary method for fabricating a giant magnetoresistance (GMR) magnetic field sensor including a long-range ordered periodic array of nano-features, according to an embodiment of the present invention;

FIGS. 17A-17B illustrate exemplary long-range ordered periodic arrays of nanofeatures in quantum-dot-based or surface-plasmon-resonance-based photoluminescent devices, according to embodiments of the present invention;

Figure 1:
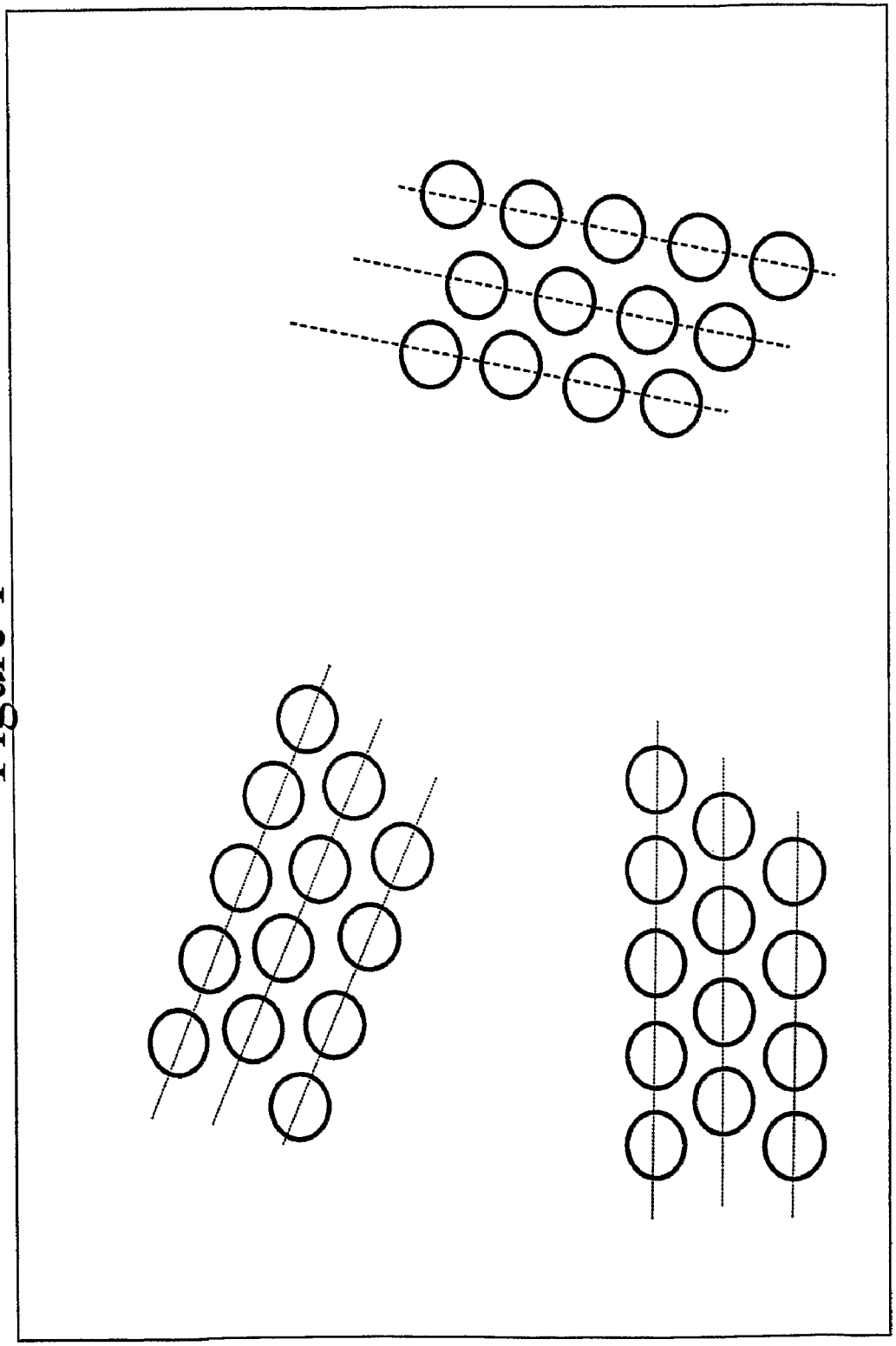
FIG. 1 illustrates an arrangement of nano-features with nucleation and growth of non-ordered domains resulting from the fabrication methods of the prior art.
Figure 2:
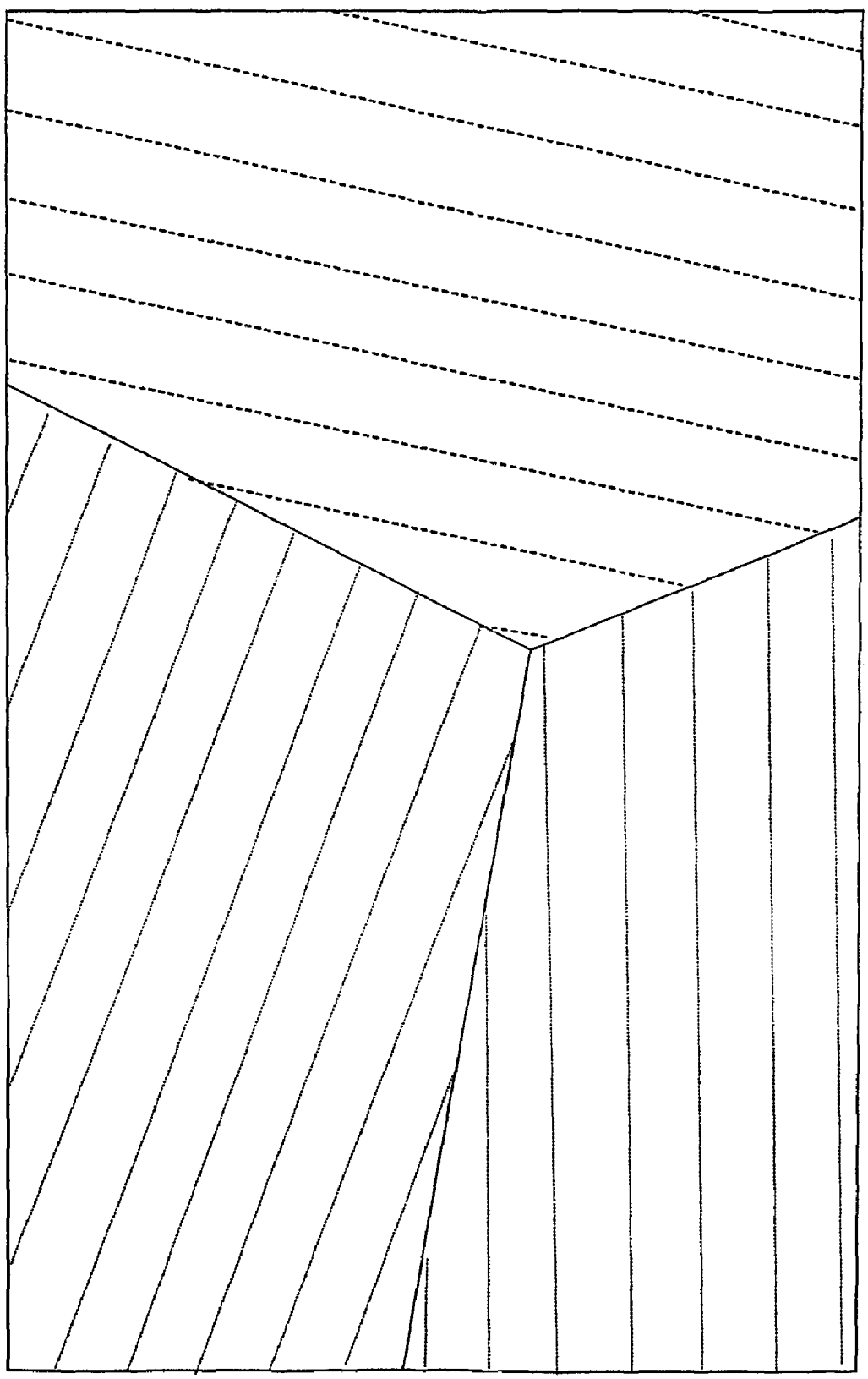
FIG. 2 illustrates the domain boundary configuration of nano-features fabricated according to prior art methods.

It is to be understood that the attached drawings are for purposes of illustrating the concepts of the invention and may not be to scale.

DETAILED DESCRIPTION OF THE INVENTION

The present invention relates to methods for the fabrication of long-range, period array of discrete nano-features, such as, for example, nano-islands, nano-particles, nano-pores, nano-compositional modifications, and nano-device components. The term "nano-feature," as used herein is intended to include any feature, structure, island, particle, pore, device component, composite, or other element that has a diameter or width of less than or equal to 100 nm, preferably less than or equal to 50 nm, and even more preferably less than or equal to 20 nm.

The terms "long-range ordered periodic array," "long-range periodically ordered array," and "long-range periodic array" as used herein are intended to include an ordered periodic array of nano-features having an area of at least approximately 1 $mm^2$, preferably at least approximately 1 $cm^2$, and even more preferably an area of at least approximately 4 $cm^2$. The percentage of non-periodic defects (i.e., nano-features that are missing, displaced or otherwise not location in their respective periodic position) fabricated according to the present invention is preferably less than 5% of the total array, more preferably less than 1%, and even more preferably less than 0.2%.

FIG. 3 illustrates an exemplary method for the fabrication of a long-range ordered periodic array of nano-features, according to an embodiment of the present invention. As shown in FIG. 3A, a material having an ordered band 10, or group of periodically arranged nano-features, is disposed on a substrate. Next, an actuator (not shown) is moved laterally in relation to the ordered band 10, thus causing a uniform/gradient reaction. As the actuator moves laterally, the disordered region 12 (i.e., the remaining portion of the material to be ordered) experiences a uniform reaction to the actuator, and the ordered band 10 gradually expands and produces a long-range ordered array of nano-features 14, as shown in FIG. 3B.

According to an embodiment of the present invention, the actuator may be any suitable source of stimuli, including, but not limited to, a heat source, a laser, one or more electrodes, an ultrasonic wave emitter, etc. Preferably, the actuator is in the form of a narrow band. One having ordinary skill in the art will appreciate that the appropriate actuator for use in the process may depend upon the material and reaction system involved. For example, for the patterning of a surfactant material (e.g., a spin-coated solution containing nano-particles), the actuator may be a narrow heater (e.g., an electrical heating wire or razor blade heater), an infrared heater, or a band of a laser beam, arranged at a controlled height over the surfactant material. According to an embodiment of the present invention, the actuator is moved laterally at a constant sweeping speed.

According to an embodiment of the present invention, for the fabrication of a long-range ordered array of nano-features on an aluminum oxide or silicon membrane with a vertical nano-pore array on the surface, or through the thickness of the membrane), a sweeping actuator, such as a narrow band of electrodes, may be moved laterally at a constant speed thus causing an electrochemical reaction of the anodizing nucleates which propagate along with the sweeping electrode motion. One having ordinary skill in the art will appreciate that the desired sweeping speed of the actuator may be experimentally determined depending on the particulars of the processing conditions (e.g., the material to be processed and the arrangement of the actuator relative to the material). Optionally, one having ordinary skill in the art will appreciate that the actuator may be moved at a non-uniform sweeping speed.

Figure 4:
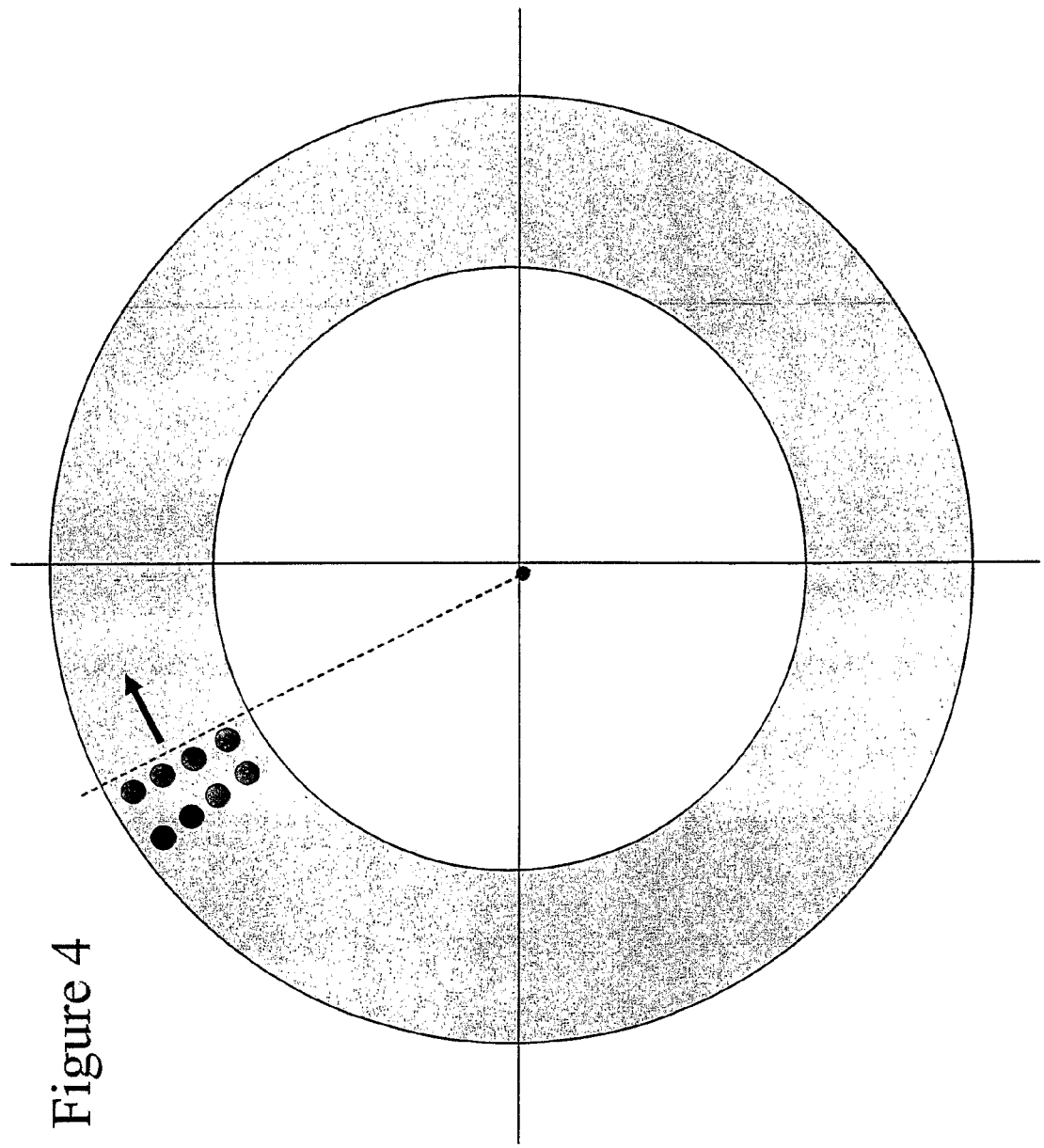
FIG. 4 illustrates a variation of the process shown in FIG. 3 wherein a circularly oriented long-range ordered periodic nano-element array is fabricated, according to an embodiment of the present invention.

According to an embodiment of the present invention, the actuator may scan the material to be processed in a circular motion, as opposed to a linear motion, as illustrated in FIG. 4. This circular motion is desired for nano-patterning in certain applications having a circularly shaped material to be pattern, such as, for example, a magnetic recording disk or a ultra-high-density recording medium. For example, for magnetic recording disks, the read/write head encodes or reads the recorded bit via circular motion as the disk rotates, and hence it is desirable to record and write the information bits along a circular path. Optionally, the disk surface may be subdivided into concentric bands for independent control of inter-particle spacing or inter-pore spacing (e.g., by using separate ordering reactions for each concentric band wherein each band may be patterned at a different sweeping speed).

According to an embodiment of the present invention, a sweeping actuator 20 (e.g., a cathode) may be used to pattern a substrate 24 (e.g., an AAO membrane or other anode) with an array of vertical nano-pores 22 through an anodization process, as shown in FIG. 5A. For example, the sweeping actuator (cathode) 20 may be arranged above a stationary aluminum substrate (anode) 24, as depicted in FIG. 5A. Alternatively, as shown in FIG. 5B, the substrate (anode) 24 may be moved relative to a stationary actuator (cathode) 25. One having ordinary skill in the art will appreciate that the movement of the substrate (anode) 24 may be lateral or circular.

According to an embodiment of the present invention, an alternative method of providing a propagating nucleation reaction for the formation of nano-features is to position an array of electrodes (cathodes) and sequentially activate one after another along the desired direction of propagation.

According to an embodiment of the present invention, a long-range periodic array of nano-features may be fabricated according to a two-step anodization process, as shown in FIGS. 5A and 5B. As shown in FIG. 5A, the first anodization step may be carried out with a sweeping electrode 20 (or sequential activation of a series of electrodes). During this first step, the electrode(s) may be moved with a relatively fast lateral or circular sweeping motion so that an array of seed anodization spots 22 are produced. These seed anodization spots 22 are generally formed as shallow pores on a surface of the material being anodized (i.e., the anode). One having ordinary skill in the art will appreciate that when using a series of electrodes, a higher than normal speed of sequential activation may be utilized. Once the periodic and long-range ordered array of the seed anodized spots 22 is generated, the second step of anodization may be performed.

In the second step, one or more stationary electrodes having a broad area cathode region 25 causes further anodization to propagate the existing shallow seed spots 22 into the depth of the substrate to form deeper nano-features or pores 26.

Figure 6A:
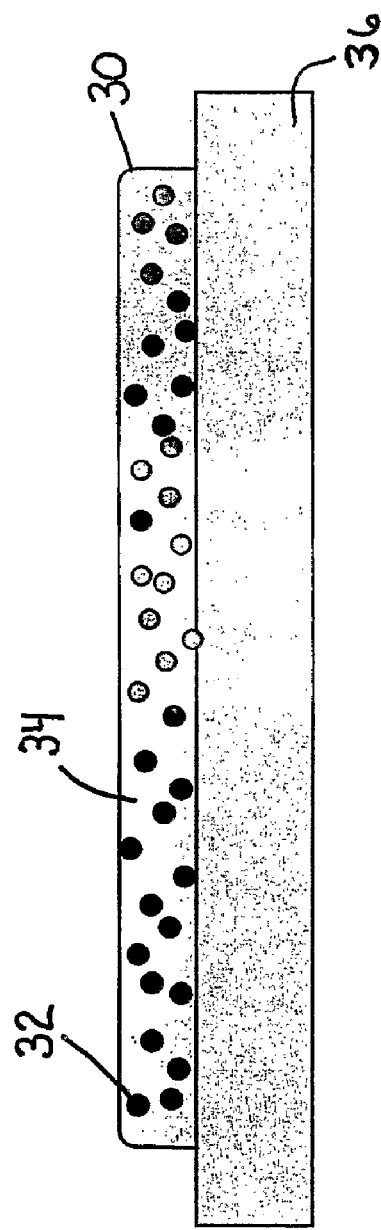
FIGS. 6A and 6B illustrate steps of an exemplary process for producing a long-range ordered periodic array of nano-particles by using laterally sweeping band of heat source, according to an embodiment of the present invention.

FIG. 6 illustrates another method for fabricating a long-range ordered array of periodic nano-features. According to an embodiment of the present invention, a colloidal solution 30 containing disordered, self-assembling nano-particles 32 and a surfactant diluted in a solvent 34 is coated on a substrate 36, as shown in FIG. 6A. Preferably, the nano-particles 32 have a monodisperse diameter size in a range of approximately 2-20 nm. One having ordinary skill in the art will appreciate that the nano-particles 32 may be fabricated according to processes known in the art, such as, for example, a polyol process or modified polyol process using organic-solution-based decomposition of metal-surfactant complexes.

According to an embodiment of the present invention, a suitable surfactant may be selected depending on the desired array of nano-particles sought (i.e., a two-dimensional array of nano-particles (monolayer) or a three-dimensional array of nano-particles). Suitable surfactants for use in the present invention include, but not limited to, chemicals such as hexadecyl phosphate, trioctyl phosphine oxide, tributhyl phosphine oxide, oleic acid, oleylamine, hexanoic acid, hexylamine, etc. For example, the use of a surfactant comprising a combination of oleic acid and oleylamine tends to produce a monolayer ordered superlattice structure of nano-particles, while the use of a surfactant comprising a hexanoic acid and hexylamine combination tends to produce a three-dimensional array combination as the surfactant. Exemplary solvents for use in the present invention include, but are not limited to, hexane or octane.

Figure 6B:
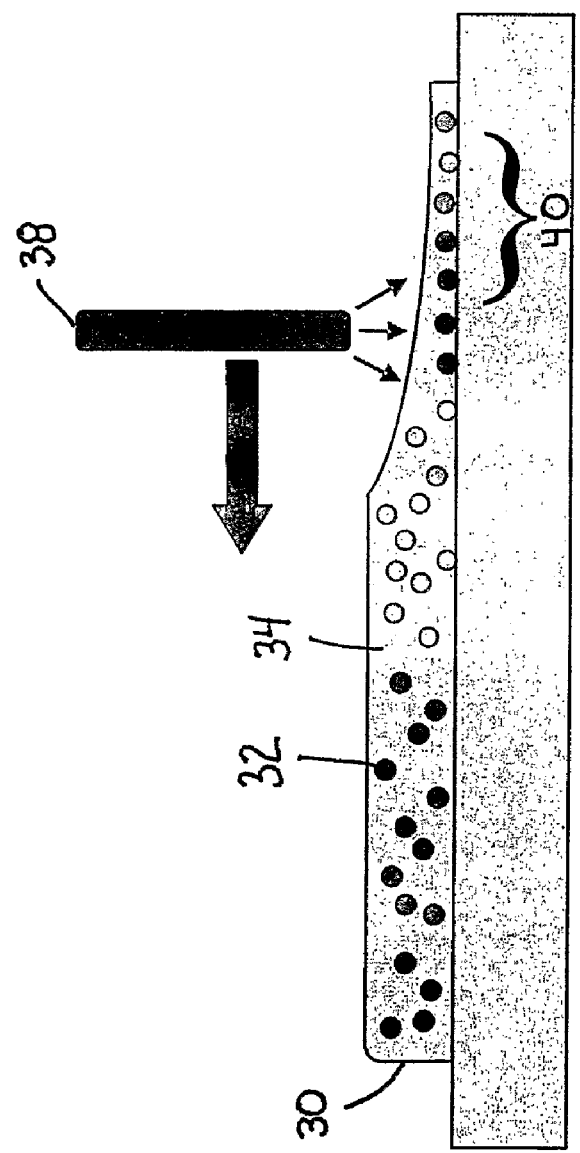

As shown in FIG. 6B, as the actuator 38, here a heater, is moved laterally, the heat emanating from the heater 38 evaporates and reduces the volume of the solvent which was diluting the colloidal solution 30 and preventing a self-assembly reaction. One having ordinary skill in the art will appreciate that heater 38 may comprise an IR heater, an electrical heater, or a laser. When the surfactant concentration is increased to a critical point by the reduction of the solvent volume, the nano-particles 32 are able to self assemble into a periodic structure 40. The sweeping movement of the heater 38 thus creates a uniform, long range ordering of nano-particles 32 as long as the speed of the moving heater remains substantially constant. The desired temperature rise to produce the long-range ordered nano-particle structure 40 is typically in the range of approximately 50-350° C., and preferably in the range of approximately 100-250° C.

According to an embodiment of the present invention, after the sweeping movement is completed, a long-range ordered particle array 40 with a monolayer or a three-dimensional multilayer ordered particle configuration is obtained, depending on the original thickness and nano-particle concentration in the spin coated colloidal solution 30. One having ordinary skill in the art will appreciate that by adjusting these parameters, the number of nano-particle layers in the long-range ordered structure may be controlled.

FIGS. 7A-7C illustrates the other exemplary arrangement for the fabrication of a long-range ordered array of nano-features, according to embodiments of the present invention. As shown in FIG. 7A, instead of a movable actuator or heat source, a stationary heat source 50, preferably in the shape of elongated strip or rod, may be arranged parallel to the edge of a substrate 52 including a material to be patterned, here a spin coated colloidal solution or film 54. The heat source 50 radiates heat which propagates laterally, thus producing a propagating ordered region in the substantially long-range ordered colloid film 54.

FIG. 7B illustrates another embodiment of the present invention wherein a series of stationary and narrow heater bands 56 (e.g., an electrical heater array) are sequentially activated at an appropriate speed such that the ordered region 58 propagates from one end of the substrate 60 to the other end of the substrate 60.

FIG. 7C illustrates a colloidal solution which is subdivided into a plurality of regions 62. One having ordinary skill in the art will appreciate that the regions may be any suitable shape, such as, for example, rectangular or circular. The shape and size of the region may be controlled by the wettability of the substrate 64 or by pre-patterning the surface of the substrate 64. When subjected to a gradient ordering reaction as described in detail above, such as, for example, the application of a sweeping heater 66, each of the regions 62 is patterned with a substantially identical long-range ordered nano-feature array.

FIGS. 8A and 8B illustrate a process for fabricating a long-range ordered diblock copolymer structure, according to an embodiment of the present invention. Generally, diblock copolymer are made up of two chemically different polymer chains or blocks which are joined by a covalent bond. Because the polymer chains or blocks are connected to each other, while being chemically incompatible with each other, the diblock copolymer tends to phase separate and self assemble into an ordered (often with a hexagonal geometry), nanoscale, mixed-phase composite structure. Depending on the chemistry and decomposition conditions, the diblock copolymers may form an ordered array with one of the polymer components taking a nano-cylindrical shape embedded in the other polymer component. Exemplary diblock copolymers suitable for use in the present invention include, but are not limited to, a mixture of polystyrene-polybutadiene and polystyrene-polyisoprene.

According to an embodiment of the present invention, the diblock copolymers 72 are coated on a substrate 70, as illustrated in FIG. 8A. One having ordinary skill in the art will appreciate that the diblock copolymers 72 may be applied or coated on the substrate 70 according to any suitable application processes, such as, for example, spin coating. The diblock copolymers 72 are diluted with a solvent, such as, for example, toluene. As shown in FIG. 8B, a heater 74 is moved laterally along the length of the diblock copolymer 72 and substrate 70 assembly. The heat emanating from the heater 74 evaporates and reduces the volume of the solvent which was diluting the diblock copolymer solution 72 and preventing a self-assembly reaction. As the heating or drying proceeds, the copolymer concentration and temperature reaches a critical point, wherein the phase decomposition of the diblock copolymers into an ordered structure 75 takes place. The sweeping movement of the heater 74 thus creates a uniform, long-range ordering of the diblock copolymer 72.

According to an embodiment of the present invention, the temperature of the heater 74 used to nucleate and grow the ordered decomposed diblock copolymer structure is typically in the range of approximately 50-350° C., and preferably in the range of approximately 100-250° C. One having ordinary skill in the art will appreciate that a single slow lateral or circular sweep of the heater 74 may be used to produce the long-range periodic ordered copolymer structure, according to an embodiment of the present invention. Alternatively, the ordering process may be performed according to a two-step process, wherein the first step consists of a rapid heat sweep to nucleate the phase decomposition, followed by a second step of stationary or laterally sweeping heat processing.

Figure 9A:
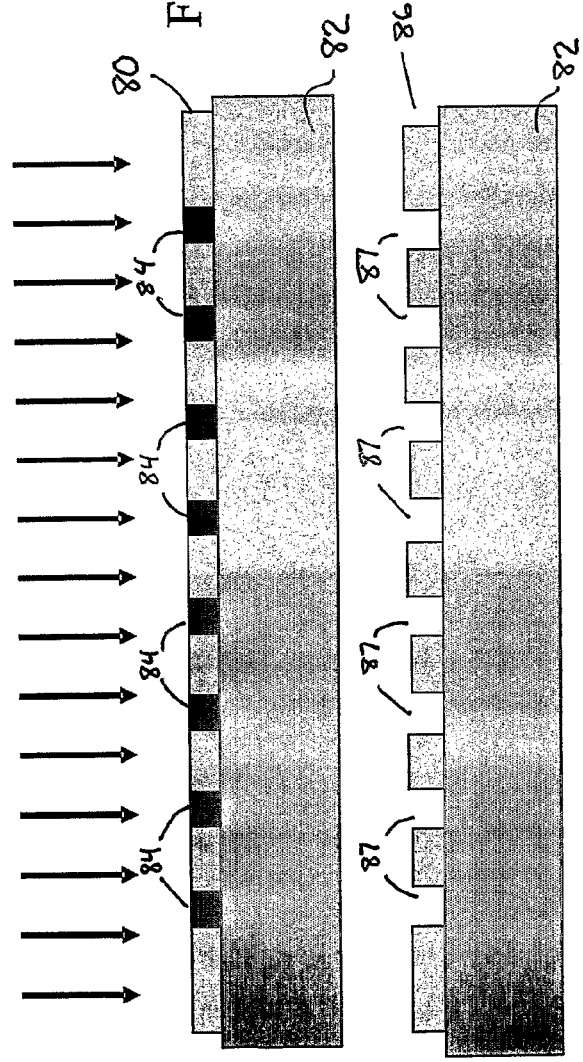
FIG. 9A-9D illustrate steps of an exemplary method of using a long-range periodic array of nanoscale vertical pore structure of patterned block copolymer as a nano-mask for fabricating a nano-island or nano-cavity array structure, according to an embodiment of the present invention.
Figure 9B:
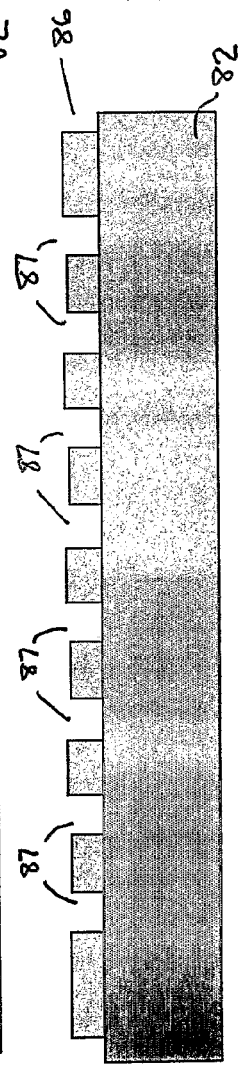
Figure 9C:
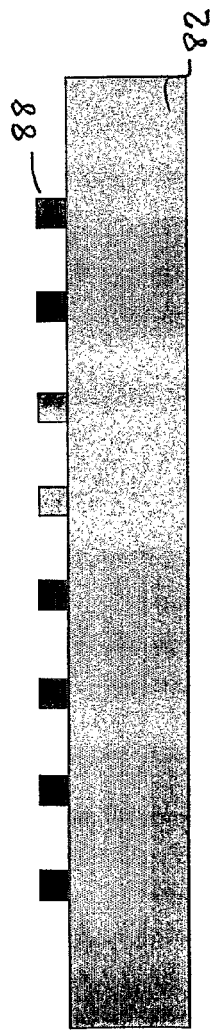

According to an embodiment of the present invention, the long-range periodic nano-structure array produced by a sweeping ordering reaction of a diblock copolymer solution may be utilized as a nano-mask to further create other types of nano-structure arrays, as illustrated in FIGS. 9A-9D. As shown in FIG. 9A, a layer of long-range periodic diblock copolymer array of nano-features 80 formed on a substrate 82 to be patterned is exposed to a differential etching process (e.g., reactive ion etching (RIE)) to remove one of the decomposed phases, for example, a cylindrical phase of the diblock copolymer 84, thus resulting in a polymer nano-cavity array mask 86 comprising a plurality of nano-cavities 87, as shown in FIG. 9B. Next, as shown in FIG. 9C, a periodic nano-cavity array 88 is generated by depositing any suitable filling material into the nano-cavities 87 of the nano-cavity array mask 86. Suitable filling materials for use in the present invention include, but are not limited to, metals, ceramics, polymers, magnetic recording media, quantum dot material, surface plasmon resonance material, and phase change memory material. One having ordinary skill in the art will appreciate that the material may be deposited into the nano-holes 87 according to any suitable deposition process, including, but not limited to sputtering, electroplating, etc.

Figure 9D:
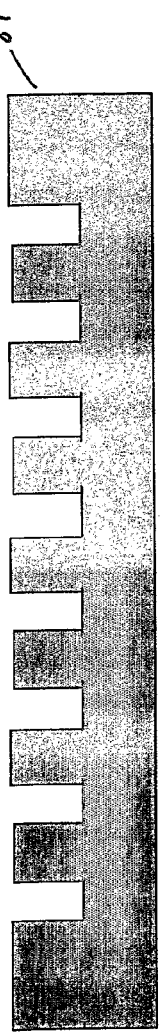

Following deposition of the nano-islands, a lift-off process is performed to remove the remaining polymer material, leaving only the periodic nano-island array 88 on the substrate 82. Alternatively, nano-hole array mask 86 may be utilized for creation of a periodic nano-pore pattern 89 via chemical or RIE etching of the nano-holes 87 of the nano-hole array mask 86, as illustrated in FIG. 9D. The nano-particles 92 may be catalyst particles, such as, for example, Pt, Ru, and/or their alloys, used for fuel cells or other chemical and electrochemical reactions, or may be, for example, Fe, Ni, Co, and/or their alloys, used for carbon nano-tube nucleation and growth during chemical vapor deposition (CVD).

Figure 10A:
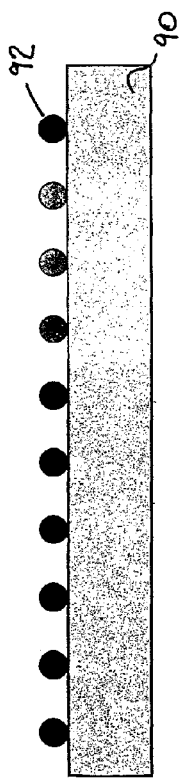
FIGS. 10A-10E illustrate exemplary long-range ordered period arrays of nano-features, according to embodiments of the present invention.

FIGS. 10A-10E illustrate various types of long-range, periodically aligned nano-feature structures fabrication according to an embodiment of the present invention. FIG. 10A shows a long-range ordered array comprising nano-particles 92 formed on a substrate 90, fabricated according to the present invention. One having ordinary skill in the art will appreciate that the nano-particles 92 may be any shape, such as, for example, spherical. Upon the application of heat upon the array of spherical nano-particles 92, diffusion bonding may be induced between the nano-particles 92 and the substrate 90, depending on the nature and solid solubility of the two materials involved. As such, the spherical shape of the nano-particles 92 may be altered with its bottom portion somewhat flattened, as necking occurs at the contact points.

Figure 10B:
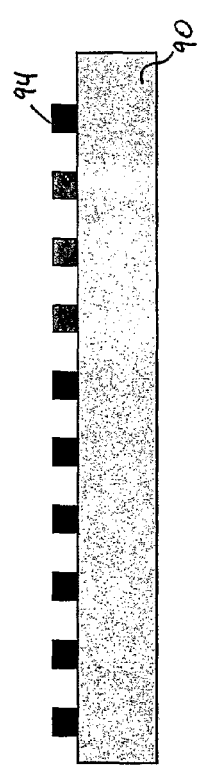

FIG. 10B illustrates a long-ranged periodic ordered array of nano-islands or nano-pillars 94, fabricated according to the present invention. The structure may be fabricated by using the nano-particle array of FIG. 10A as a nano-mask, as discussed in detail below with respect to FIGS. 11-14.

Figure 10C:
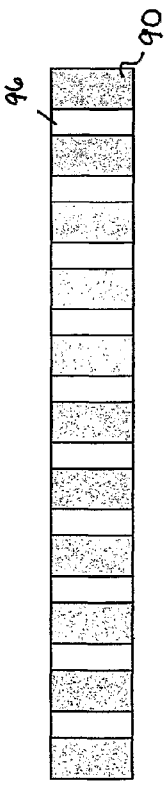

FIG. 10C illustrates a long-ranged periodic ordered array of nano-pores 96, fabricated according to the sweeping electrode anodizing process described above, or, alternatively, by using an ordered nano-particle array as a nano-mask.

Figure 10D:
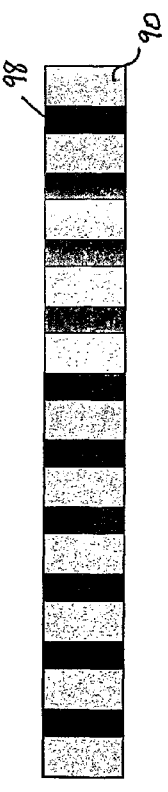

FIG. 10D illustrates a long-ranged periodic ordered array of filled nano-pores 98, wherein vertically aligned nano-pores 96 are filled with a desired material. One having ordinary skill in the art will appreciate that the filling material may be a metal, a ceramic, or a polymer material having desirable electronic, magnetic, photonic, or catalytic properties. The nano-pores 96 may be filled according to any suitable filling process, such as, for example, electrodeposition after metallizing at least a portion of the bottom of the nano-pores 96. For example, the filling process may include using supercritical $CO_2$ deposition of salts, followed by decomposition of the salts infiltrated into the nano-pores 96. According to another example, the nano-pores 96 may be filled by physical vapor deposition (sputtering or evaporation) of the filling material onto the top surface the substrate 90 and at least a portion of the nano-pores 96, followed by planarization polishing. According to yet another example, the nano-pores 96 may be filled by chemical vapor deposition of the filling material and planarization of the top surface of the substrate 90.

Figure 10E:
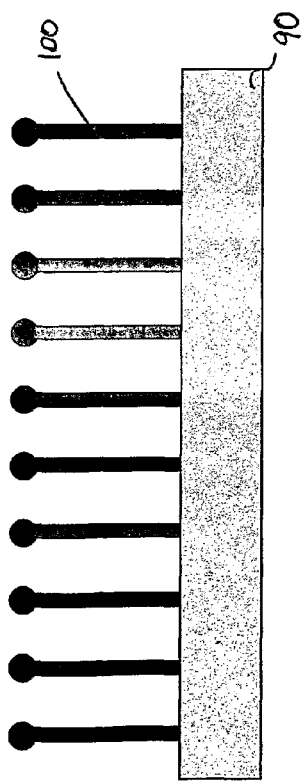

FIG. 10E illustrates a long-range periodic ordered array of nano-tubes or nano-wires 100. One having ordinary skill in the art will appreciate that the nano-tubes or nano-wires 100 may include, but are not limited to, single-wall carbon, multi-wall carbon, ZnO, Si, $SiO_2$, GaAs, GaN, $TiO_2$, etc. The nano-tubes or nano-wires 100 may be grown using a chemical vapor deposition (CVD) process, using the periodic nano-particle array of FIG. 10A as seed catalysts. For example, for growth of periodic carbon nano-tubes 100, Ni, Co or Fe nano-particles are commonly used. According to another example, for Si or ZnO nano-wires 100, a periodic array of Au nano-particles may be used. Such periodic nano-tubes or nano-wires 100 exhibit a high aspect ratio, and, as such, are useful as: 1) electron field emitter devices (i.e., in displays and microwave amplifiers); 2) vertical nano-interconnect conductors; 3) electrochemical electrodes; 4) solar cells; 5) hydrogen storage devices; 6) luminescent devices; and/or 7) light emitting devices.

According to an embodiment of the present invention, the nano-features illustrated in FIGS. 10A-10E have a preferred diameter of less than or equal to approximately 100 nm, more preferably less than or equal to approximately 50 nm, even more preferably less than or equal to approximately 20 nm.

The long-range ordered periodic nano-feature arrays fabricated according to the methods described above are useful for a variety of applications, including, but not limited to, the six applications described in detail below.

I) Nano-Masks for Use in Nano-Fabrication Processes

A long-range periodic array of nano-features is useful as a nano-mask for use in a variety of nano-fabrication processes. High atomic weight metals, alloys, and compounds (e.g., Au, Pd, Pt, Os, and W) are preferred for use as a nano-particle mask material for electron beam lithography, soft-x-ray lithography, extreme UV lithography, ion implantation or reactive ion etching (RIE), due to their resistant to penetration by electrons, x-rays, and ion beams.

II) Magnetic Recording Applications

Magnetic recording applications, such as the patterned of ultra-high-density magnetic recording media, may also be patterned with long-range ordered arrays of nano-features fabricated according to the present invention. Specifically, ultra-high-density magnetic recording media may use magnetic nano-particles as recorded bits or as a component of magnetic sensor. In addition, relatively low coercive force nano-particle materials like Co, Fe, Ni, Ni—Fe, Fe-oxide, Ni—Zn ferrite, Mn—Zn ferrite may be utilized as a magnetic field sensor, such as a giant magnetoresistance (GMR) sensor for recording read head. Further, high-coercivity and high magnetic anisotropy nano-particle materials such as FePt, CoPt and rare earth cobalt compounds are particularly suited for patterning magnetic recording media.

III) Semiconductor Quantum Dot Devices

Quantum dot nano-particles, such as, for example, CdSe, CdS, CdTe, ZnS, InP, InAs, InGaAs, GaAs, GaN, and Si, are suitable for use in quantum dot devices, such as, for example, light emitting diodes (LEDs), quantum lasers, photosensitization apparatus (e.g., solar cells), optical switches, luminescent devices (e.g., displays), and identification tags.

IV) Addressable Electronic Devices

Long-range periodic placement of nano-features according to the methods of the present invention are useful for a variety of X-Y addressable devices including, but not limited to, memories, switches, and logic devices.

V) Efficient Catalyst Array

The extremely fine nano-feature size and uniform and predictable spacing between neighboring particles (i.e., non-agglomeration) of the long-range periodic ordered nano-particle arrays according to the present invention result in greater availability of catalyst surface area. Thus, the arrays are particularly suited for use as an efficient catalyst structure, such as, for example, Pt, Pd, and Rh-type nano-particle arrays for fuel cell electrodes, catalytic converters for automobiles, and other chemical/electrochemical reactions. According to an embodiment of the present invention, the ordered nano-feature array is useful for enabling synthesis of a long-range ordered nano-feature (e.g., nano-wire) array because each of the periodically positioned catalyst nano-features (e.g., 1-50 nm diameter periodic Ni particles in a periodic array on Si substrate) may serve as a nuclei at a carbon nano-tube growth front during chemical vapor deposition from a carbon-containing gas, thus producing a long-range ordered nano-tube array.

VI) Seeding for Synthesis of Long-Range Periodic Nano-Tubes/Nano-Wires

According to an embodiment of the present invention, the periodic nano-feature array may be utilized as a highly desirable seeding technique for fabrication of periodically spaced nano-tubes/nano-wires. There are many advantages of having a periodic arrangement of vertically aligned nano-tubes/nano-wires. Since they are equally spaced-apart, there is less probability of agglomeration of neighboring nano-tubes/nano-wires due to van der Waal's force and other surface interactions, which provides more available surface area for fuel cell, hydrogen storage and other catalytic applications. The reduced agglomeration of nano-tubes/nano-wires ensures uniformity in the aspect ratio for uniform field emission behavior. In addition, the ability to have periodic placement of nano-tubes/nano-wires is desirable for fabrication of X-Y matrix addressable nano-devices such as memory, switch and logic devices, and vertical nano-interconnections. FIGS. 11A-11C illustrate an exemplary application of the long-range periodic nano-feature array as a nano-lithography mask for the purpose of electron-beam, soft x-ray or extreme UV nano-lithography. As shown in FIG. 11A, the layer to be patterned 110 (e.g., a metal, ceramic, semiconductor or electronically functional polymer material) is first deposited on a substrate 120. A layer of resist material 130 (e.g., an e-beam resist such as, for example, PMMA) is then spin coated over the layer to be patterned 110. Next, a layer comprising a long-range periodic nano-feature array 140 is then placed on top of the resist layer 130 as a nano-feature mask, and the assembly is exposed to an electron-beam, soft x-ray or extreme UV. The exposed portion of the resist layer 130 (i.e., the portion of the resist layer that is not covered by the nano-feature mask) form exposed resist nano-regions 135. Removal of the nano-particle mask, followed by chemical or reactive ion etching results in a pattern having a periodic array of nano-pillars or nano-islands 150 if a positive resist is used, as shown in FIG. 11B, or a pattern having a periodic array of nano-pores or nano-holes 160 if a negative resist is used, as shown in FIG. 11C.

Figure 12A:
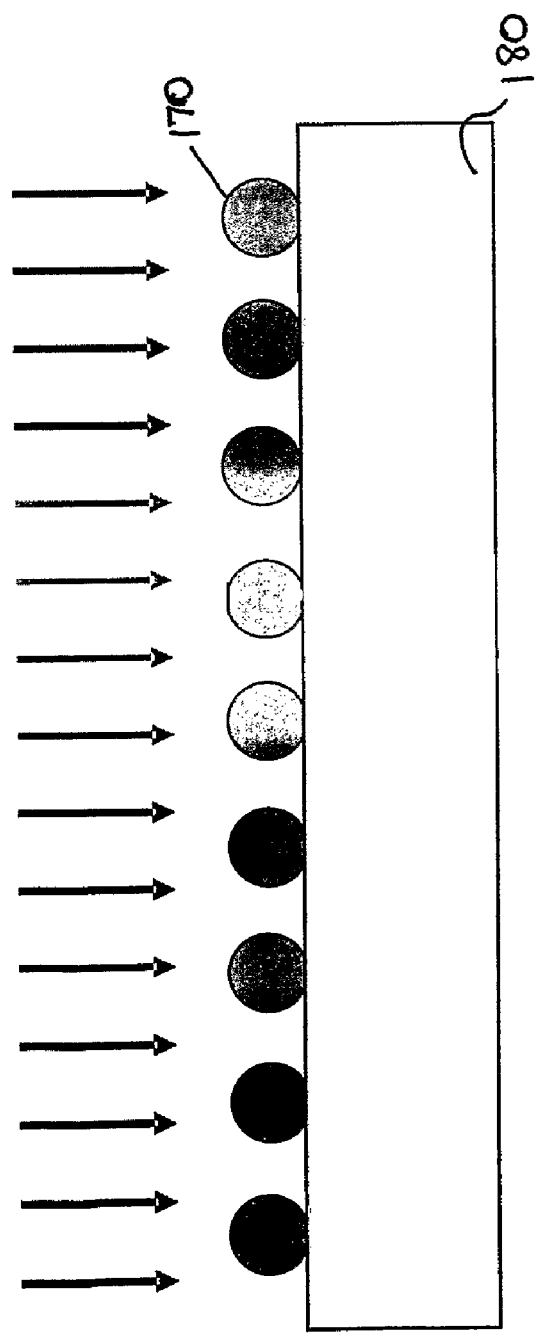
FIGS. 12A-12B show an exemplary process wherein a long-range ordered periodic array of nano-features are used as a nano-mask in a reactive ion etch (RIE) process, according to an embodiment of the present invention.
Figure 12B:
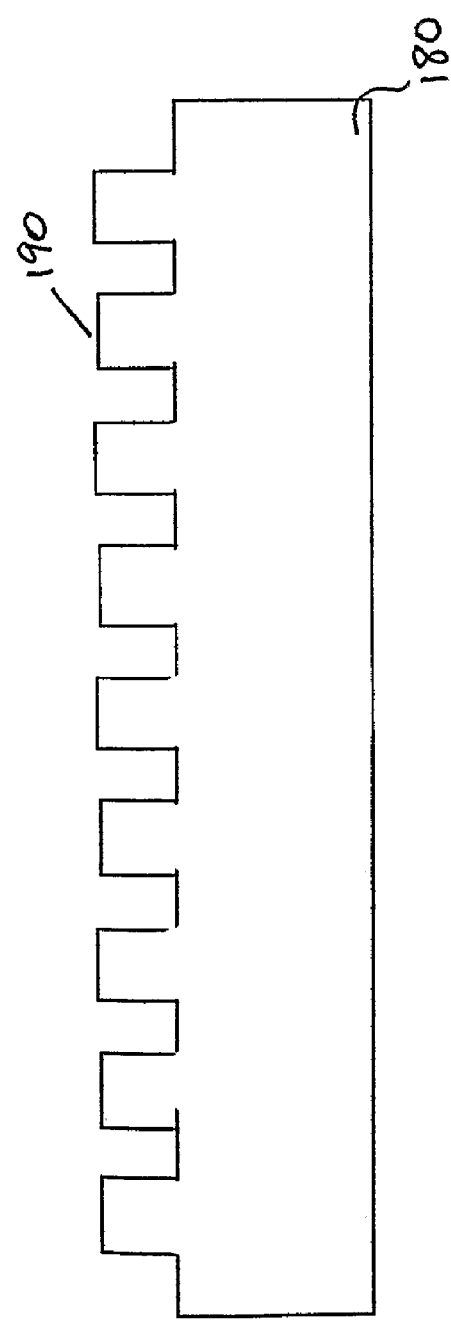
Figure 13A:
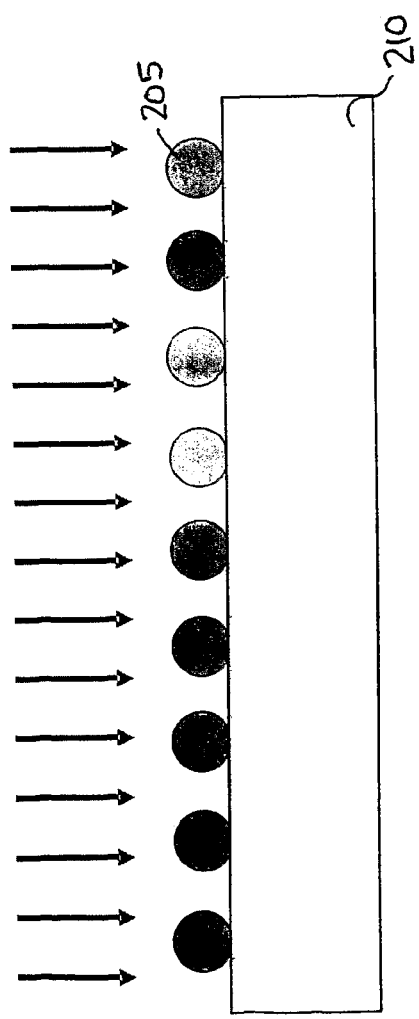
FIGS. 13A-13C illustrate an exemplary process of using a long-range ordered periodic array of nano-features as a nano-mask for creating a locally ion-implanted, nano-composition variation array structure and a nano-cavity array structure, according to an embodiment of the present invention.
Figure 13B:
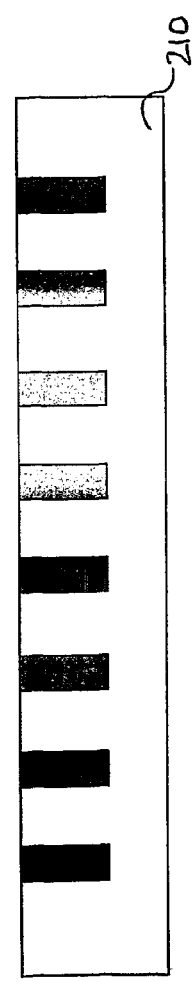
Figure 13C:
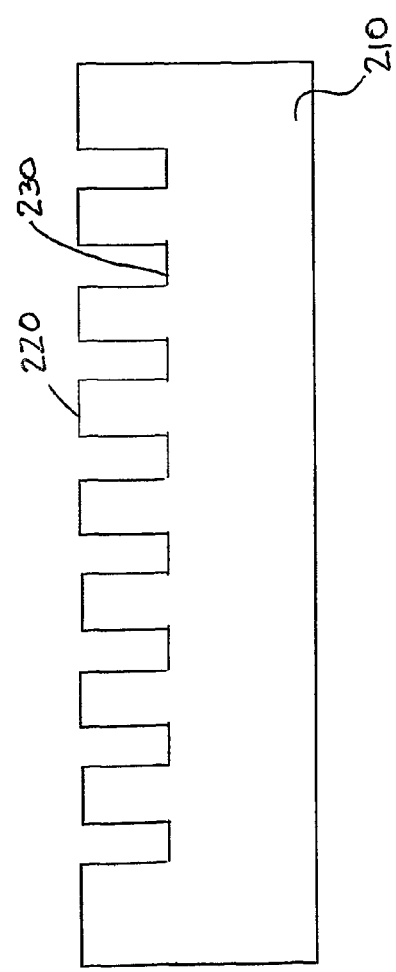

According to an embodiment of the present invention, a long-range periodic array of nano-features may be utilized as nano-mask for patterning in a reactive ion etching (RIE) or ion milling process. As shown in FIGS. 12A and 12B, a long-range periodic nano-mask 170 may be applied to a substrate 180 to be patterned. As shown in FIG. 12B, the RIE or ion milling process patterns the substrate 180 with an array of periodic nano-features. A long-range periodic array of nano-pillars 190 produced by RIE may be useful in many applications, including, but not limited to, implant masking and/or a the fabrication of high-surface-area, mechanically stable catalyst arrays. In addition, a long-range nano-doped semiconductor with an array of periodically implanted nano-features may be fabricated according to the present invention, as shown in FIG. 13A-13C. Ion implantation of semiconductor dopants (e.g., with boron ions for p-type doping and phosphorous ions for n type doping into Si) and magnetic semiconductor dopants (e.g., Mn or Co ion implantation into GaN, GaAs, $TiO_2$, Si, etc.) may be performed using the long-range periodic array of nano-features as a mask that blocks ion implantation of a substrate 210 to be patterned, as depicted in FIG. 13A. According to an embodiment of the present invention, nano-particles 205 of relatively heavy metals such as, for example, Au, Pd, Pt, Os, and W, are preferred for use as the implantation mask because they provide efficient blockage of ion penetration. For ion implantation of lighter ions, such as boron or phosphorous, less heavy metal nano-particles 205 may be used. In the arrangement shown in FIG. 13A, the implanted ions selectively penetrate the substrate 210 at locations surrounding the nano-particles, as illustrated in the pattern shown in FIG. 13B. These long-range periodic array of nano-doped compositional variations are useful for creating new nano-devices, including, but not limited to a semiconductor array, quantum dot array, field effect transistor (FET) array, spintronics device array, light emitting diode (LED) array. Preferably, the nano-doped structures preferably have a diameter in a range of approximately 1-50 nm, and more preferentially in a range of approximately 2-30 nm.

The ion implantation method using long-range periodic nano-particle array as a mask may also be utilized as a means of creating nano-features. It is known that doping of semiconductors, such as silicon substantially influences the chemical etch rate. For example, boron doping in silicon at a concentration range of approximately $10^{20}/cm^3$ may reduce the etch rate of Si using KOH or ethylene diamine pyrocatechol (EDP) by at least one order of magnitude. It is also known that n-type doping of Si (e.g., with phosphorous) significantly increases the dry etch rate (by RIE) using halogen-based reactive plasmas as compared to the undoped or p-type doped Si. Using these effects, the methods of the present invention may be used to create a long-range ordered periodic array of nano-features, such as, for example, nano-pillars 220 and/or nano-cavities 230, in semiconductors, as illustrated in FIG. 13C. Such a long-range ordered periodic array of nano-features may be useful as a nano-implant mask for the synthesis of other nano-feature arrays, or, for the fabrication of high-surface-area, mechanically stable catalyst arrays.

The long-range ordered periodic array of nano-cavities or nano-pores may be useful as a basis for filling the nano-pores with other materials for the fabrication of nano-composites, ultra-high-density magnetic recording media, quantum dot array devices, etc. One having ordinary skill in the art will appreciate that both the long-range ordered periodic array of nano-pillars and nano-cavities in semiconductors, wherein the nano-features have a diameter in a range of approximately 2-10 nm, may be useful as luminescent devices or LED devices.

Figure 14A:
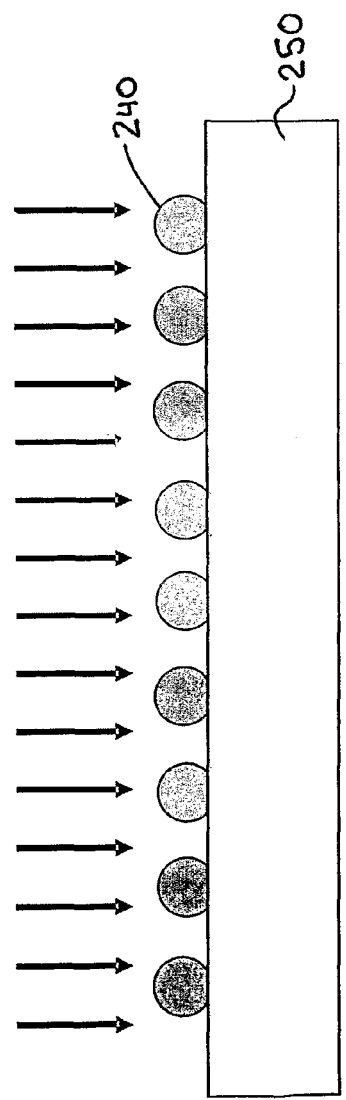
FIGS. 14A-14D illustrate an exemplary process of depositing a metal, ceramic or polymer layer on top of a long-range ordered periodic array of nano-features to create a nano-cavity array structure, according to an embodiment of the present invention.
Figure 14B:
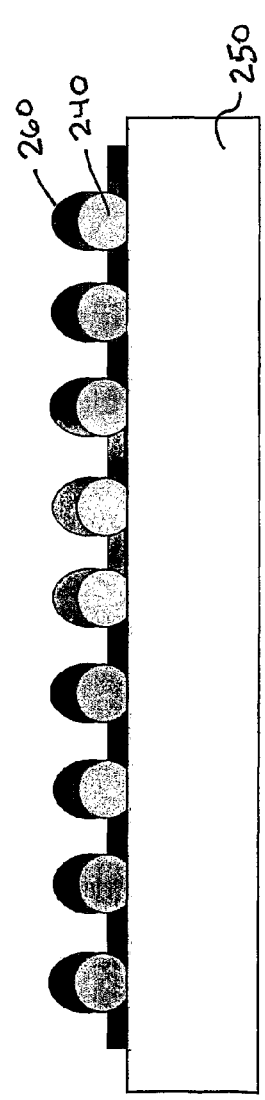

FIG. 14A-14D illustrates an alternative method of using a long-range ordered periodic nano-feature array as a chemical etch mask or reactive ion etch mask. As shown in FIG. 14A, the long-range ordered periodic nano-feature array 240 is disposed on a substrate 250 to be patterned. Optionally, the substrate 250 may be coated with thin film layer to be patterned. Next, a film of etch-resistant material 260 is deposited onto the ordered array of nano-features 240, as illustrated in FIG. 14B. One having ordinary skill in the art will appreciate that the etch resistant material may comprise any suitable material, including, but not limited to acid-resistant metal, a ceramic, a polymer, Cr, $SiO_2$, Si-nitride, and $Al_2O_3$.

Figure 14C:
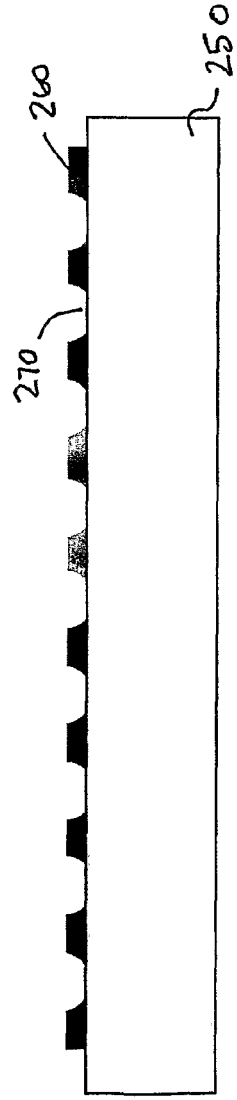
Figure 14D:
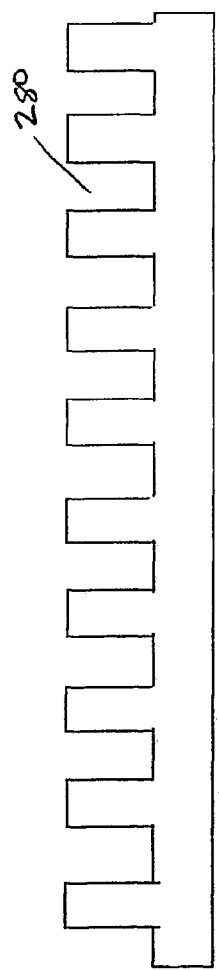

The nano-feature array 240 is then removed according to any suitable means, such as, for example, mechanical means (e.g., by a brushing reaction), ultrasonic agitation, or by magnetic means (e.g., pulling off the nano-features using a magnet). The resultant substrate 250, as shown in FIG. 14C, includes an etch-resistant coating 260 with holes or openings 270 corresponding to the nano-features of the array 240 (e.g., circular openings) through which the substrate 250 (or the thin film layer coated on the substrate surface) may be chemically or RIE etched to form a long-range periodic nano-cavity array 280, as shown in FIG. 14D. One having ordinary skill in the art will appreciate that the etching process may be controlled to produce deep nano-cavities or shallow dimples, which may be used as nuclei for an anodizing reaction on the substrate (e.g., an aluminum, titanium or silicon substrate) to produce a long-range periodic nano-pore array composed of, for example, $Al_2O_3$, $TiO_2$, $SiO_2$, or porous Si.

According to an embodiment of the present invention, the long-range periodic array of nano-features (e.g., nano-particles, nano-islands, and nano-cavities) of the present invention may be used in fabricating ultra-high-density, nano-patterned recording media. Information storage, such as magnetic recording, is an important part of modern computer technology. Conventional magnetic recording systems, such as computer disk drives, typically use recording medium comprising a continuous magnetic thin film deposited on a rigid substrate as the. Each bit of information is stored by magnetizing a small area on the magnetic film using a write head that provides a writing magnetic field. The magnetization strength and the location of each magnetic bit are optimally defined in a precise manner to allow a flying magnetic sensor (read head) to retrieve the written information. Each magnetic bit in the magnetic recording medium contains one magnetized region that consists of many small magnetized grains.

Due to the trend toward higher recording density, the magnetic bit size is continuously being reduced. While the current state-of-the-art magnetic recording density is in the regime of approximately 200 Gigabits/$in^2$, it is desirable to further increase the recording density to a much higher value, for example, beyond 1 Terabit/$in^2$, preferably using perpendicular recording rather than the inherently lower-density longitudinal recording. Substantial reduction of the size of magnetic bits, below several nanometers, however, tends to make the bit magnetization unstable due to the superparamagnetic phenomena occurring at ambient operating temperatures.

Figure 15A:
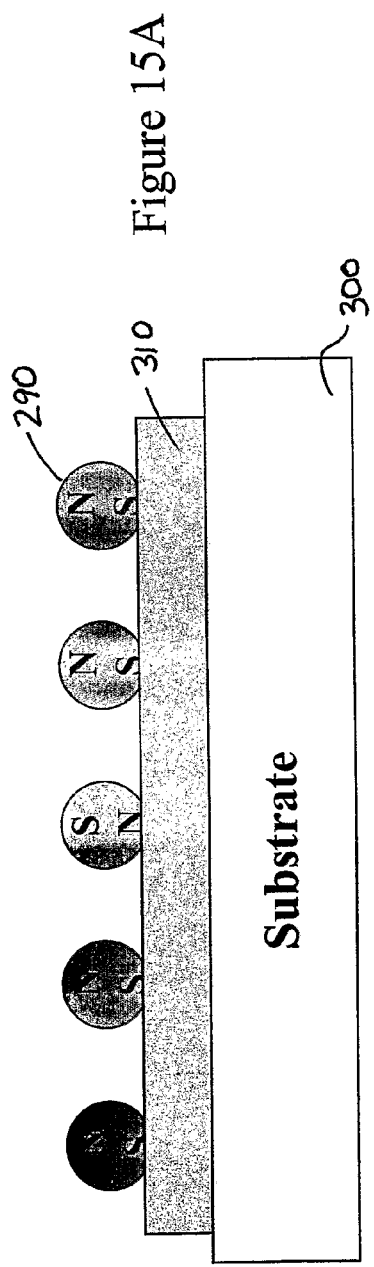
FIGS. 15A-15C illustrate exemplary configurations of ultra-high-density magnetic recording media having a long-range ordered periodic array of nano-features, according to an embodiment of the present invention.
Figure 15B:
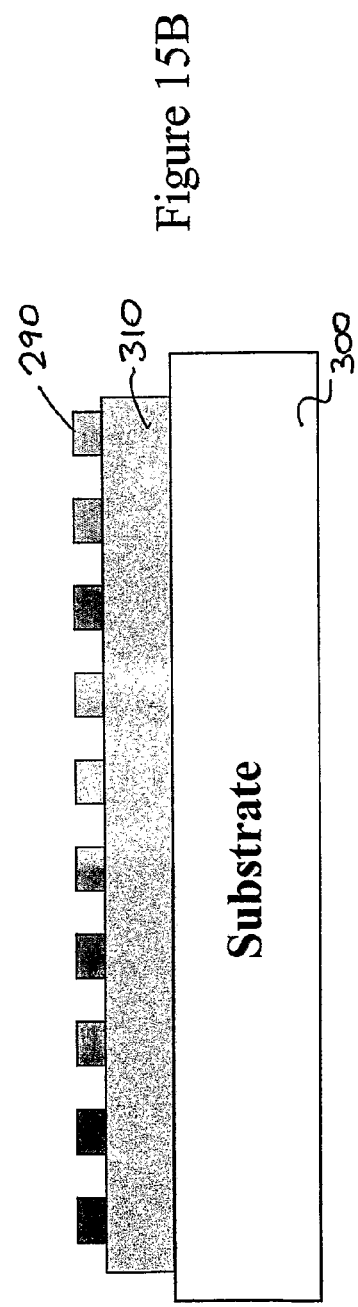
Figure 15C:
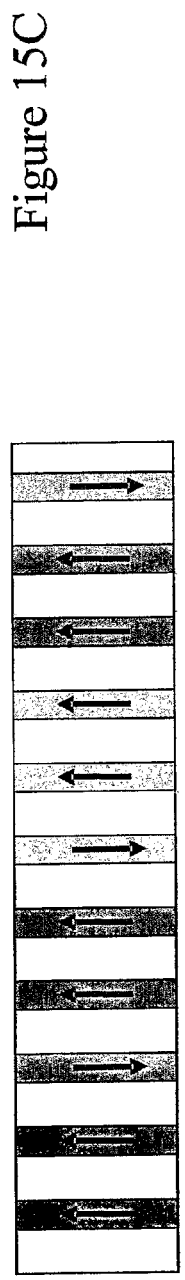

In order to overcome the problems caused by the superparamagnetic limit and provide sufficient signal to noise ratio for small magnetic islands, patterned magnetic media with high magnetocrystalline anisotropy are suitable. In patterned magnetic media, the conventional continuous magnetic film that covers the rigid disk substrate is replaced by an array of discrete magnetic regions such as nano-islands, each of which serves as a single magnetic bit. (See, for example, U.S. Pat. No. 5,587,223, issued to White et al., and U.S. Pat. No. 6,440,520, issued to Baglin et al.) For successful application of patterned magnetic recording media, it is highly desirable that the patterned magnetic bits are precisely positioned over a large area in a periodic fashion so as to be efficiently synchronized with the nanoscale read/write head as the magnetic disk rotates. A long-range circular arrangement of periodically spaced magnetic nano-islands, for example, fabricated by the circular movement of an actuator, as described in detail with respect to FIG. 4, is particularly useful as a hard disk drive magnetic recording media. The present invention provides for the fabrication of ultra-high-density magnetic recording bit arrays having a recording density of at least approximately 0.5 Terabit/$in^2$, wherein the bits are arranged in a periodic fashion over an area of at least approximately 1 $mm^2$. More preferably, the present invention provides for the fabrication of ultra-high-density magnetic recording bit arrays having a recording density of at least approximately 1 Terabit/$in^2$, wherein the bits are arranged in a periodic fashion over an area of at least approximately 1 $cm^2$. Such periodic ordered nano-island arrays may be prepared according to the methods described in detail in relation to FIGS. 3-14 and 18. FIGS. 15A-15C illustrate exemplary ultra-high-density-magnetic recording media using a long-range ordered array of magnetic nano-islands or nano-columns fabricated according to the methods of the present invention. According to an embodiment of the present invention, magnetic recording media nano-particles arranged in a long-range ordered periodic array 290 are disposed on a substrate 300. The nano-particles may be composed of materials including, but not limited to, FePt or CoPt type intermetallic compounds, Co—Cr—Ta—Pt type alloys, Sm—Co, Nd—Fe—B, and other rare-earth alloys, etc. According to an embodiment of the present invention, a softmagnet underlayer (SUL) 310 with relatively low coercive force (e.g., with a value of less than approximately 10 oersteds, and preferably less than approximately 2 oersteds, as is common with soft magnet alloys including Ni—Fe permalloy, Fe—Co base alloys, amorphous and nano-crystalline alloys, Fe—Co—B, Fe—Ta—N) may optionally be placed under the magnetic recording media array 290, as shown in FIGS. 15A and 15B. The SUL layer 310 is used to improve the magnetic behavior and reduce the self demagnetization factor of the hard magnetic recording bit.

As shown in FIG. 15C, a long-range periodic nano-pore array 290 fabricated according to the present invention may be further processed such that the nano-pores are filled with a high anisotropy, high coercivity material, such as, for example, FePt, CoPt, Co—Cr—Ta—Pt, Sm—Co, and Nd—Fe—B. The filled nano-pores form nano-rods which serve as discrete recorded magnetic bits. According to an embodiment of the present invention, the filling of the nano-pore array may be accomplished by any suitable filling process, including, but not limited to electrodeposition, physical or chemical vapor deposition, or supercritical $CO_2$ deposition using supercritical $CO_2$ with dissolved mixed salts containing constituent metals.

According to an embodiment of the present invention, the long-range ordered magnetic nano-particle array may be used to create giant magnetoresistance (GMR) magnetic sensor devices, as shown in FIGS. 16A-16C. Referring to FIG. 16A, a long-range ordered periodic array of soft magnetic or superparamagnetic nano-features 320 are disposed on a substrate 330. Next, as shown in FIG. 16B, the nano-feature array 320 and the substrate 330 are coated with an electrical conductor 340 using any suitable coating process, such as, for example, sputtering or evaporation, to construct a GMR sensor layer 350. One having ordinary skill in the art will appreciate that the electrical conductor 340 may compose any suitable conductive material, including, but not limited to Cu, Ag, Au, Al, Ti, Mo, and W.

One having ordinary skill in the art will appreciate that the magnetic nano-features may be any suitable shape, such as, for example, spherical, in-plane elongated rods, or vertical rods. Preferably, the nano-features have a diameter in a range of approximately 2-50 nm. Because of the improved periodic nature of the magnetic nano-feature array produced according the present invention, significantly improved GMR signals may be achieved. Alternatively, a plurality of GMR sensor layers 360 may be added to produce a three-dimensional multilayer GMR structure, as shown in FIG. 16C.

FIGS. 17A and 17B illustrate exemplary quantum dot devices and surface plasmon resonance devices which include long-range ordered periodic nano-feature arrays fabricated according to the methods of the present invention. As shown in FIG. 17, a long-range ordered periodic array of semiconductor quantum dot nano-features 370A arranged on a substrate 380 may be stimulated by a relatively broad incident stimulating light ($\lambda_1$) to emit sharply defined light with definite wavelength ($\lambda_2$). The quantum dot nano-features 370A may be nano-particles (as shown in FIG. 17A), nano-islands (as shown in FIG. 17B), or nano-porous membranes filled with vertical nano-rods (not shown). The specific photoluminescence wavelength ($\lambda_2$) may be controlled by the size and shape of the quantum dots. The long-range periodic array of semiconductor quantum dots 370A may be composed of any suitable material including, but not limited to, Si, CdSe, CdS, CdTe, ZnS, InP, InAs, InGaAs, GaAs, and GaN. The long-range ordered array of quantum dots is suitable for use in quantum dot devices such as, for example, LEDs, quantum lasers, photosensitization apparatus (e.g., solar cells), optical switches, luminescent devices (e.g., displays), and identification tags.

In addition, a long-range ordered array of surface plasmon resonance nano-features 370B (i.e., highly conductive metal nano-features such as Au, Ag, Pt, Ni, Co, preferably having a diameter in a range of approximately 2-30 nm, arranged on a substrate 380 may produce a strong and sharply defined surface plasmon resonance (SPR) emission in response to a stimulating light ($\lambda_1$). As described above, the surface plasmon resonance nano-features 370B may be nano-particles (as shown in FIG. 17A), nano-islands (as shown in FIG. 17B), or nano-porous membranes filled with vertical nano-rods (not shown). The photoluminescence wavelength ($\lambda_2$) and color of the SPR nano-features 370B are also controlled by their size and shape. The long-range ordered periodic array of surface plasmon resonance nano-features according to the present invention are particularly suited for use in photonic and luminescent devices (e.g., displays) and identification tags.

Figure 18B:
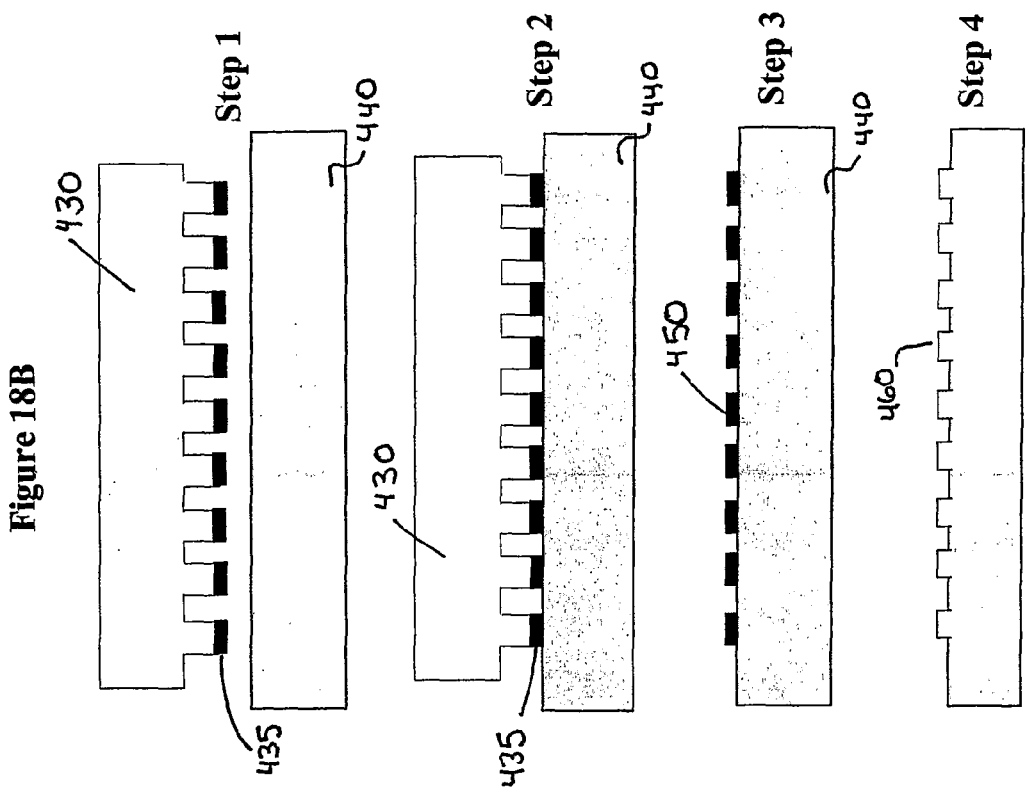
FIGS. 18A-18B illustrate exemplary processes for using a long-range ordered periodic array as a nano-imprint master pattern in a nano-imprint process, according to embodiments of the present invention.
Figure 18A:
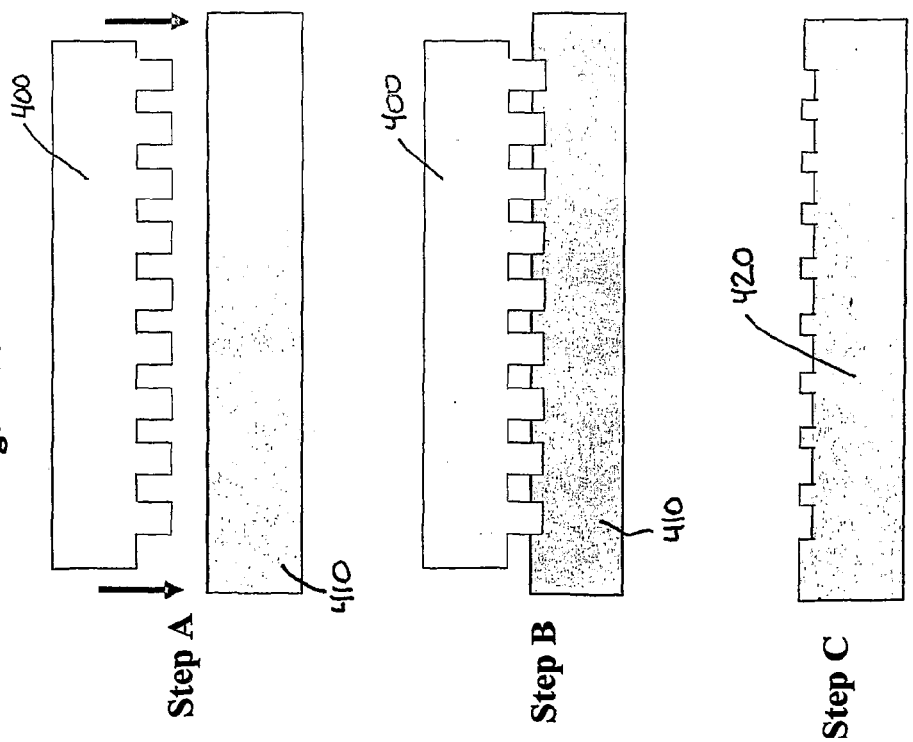

FIGS. 18A and 18B illustrates two exemplary processes for using the long-range ordered periodic array of nano-features as a nano-imprint master mask. According to an embodiment of the present invention, a nano-imprint master pattern or stamp 400 is aligned with and moved toward a soft substrate 410, as shown in step A. The nano-imprint master pattern 400 is then compressed into the soft substrate 410, as shown in step B. The nano-imprint master pattern 400 is then removed, thus patterning the substrate 410 with a long-range ordered periodic array of nano-protrusions or nano-cavities 420, as shown in step C. The resulting long-range ordered periodic array of nano-protrusions or nano-cavities 420 may be used as, for example, optical gratings or as a mold or substrate (e.g., with a thin metal or semiconductor coating) to fabricate various nano-devices including actively photonic or luminescence devices, magnetic recording media and magnetic sensors, catalytic surfaces, and addressable memory, switch or logic devices.

An alternative embodiment of a nano-imprint application of the long-range ordered periodic array of nano-features of the present invention is shown in FIG. 18B. In step 1, a master pattern having protruding nano-islands or nano-pillars 430 is dipped onto a flat pad coated with an ink or paste 435 containing desired materials, and picks up a nanoscale quantity of the ink/paste material 435. In step 2, the master pattern 430 coated with the ink/paste 435 is brought into contact with a substrate 440 to transfer the ink/paste material 435 onto the substrate 440, in the form of a plurality of nano-islands 450 (as shown in step 3). The ink/paste 435 may be any suitable material, including, but not limited to a passive polymer, an active polymer (e.g., a light emitting polymer responsive to electrical or optical stimulations), or a composite of a liquid polymer base and solid metal/alloy nano-particles or metal-containing salts.

In the case of the composite polymer containing metal/alloy nano-particles or metal-containing salts, the substrate 440 having the deposited nano-island ink/paste 450 may be subjected to chemical etching, RIE etching, or baked at high temperature to burn away the polymer and leave a consolidated metal/alloy or compound nano-islands 460, as illustrated in step 4. Such nano-islands 460 may be used for various nano-devices including, but not limited to ultra-high-density magnetic recording media, magnetic field sensor, photonic or luminescent devices including quantum dot devices, surface plasmon resonance devices, light emitting devices, energy conversion devices (e.g., catalytic fuel cells and automobile catalytic converters), displays, identification tags, and addressable memory, switch or logic devices.

The long-range periodic nano-imprint master pattern fabricated according to an embodiment of the present invention may be used as a lithography/etch mask to produce periodic nano-features according to any suitable patterning process including, but not limited to, e-beam nano-lithography, soft-x-ray nano-lithography, extreme UV nano-lithography, ion beam implantation patterning, chemical etch patterning, and reactive ion etch patterning. If used as a mask in during further processing, the material of the transferred nano-imprinted pattern (shown in step 3 of FIG. 18B) is advantageously selected such that it appropriately blocks incoming electrons, x-ray, UV light, ion beam, and etchant chemicals. For example, a mask for use in an acid-based chemical etching process is preferably composed of a polymer, an oxide (e.g., a low melting point oxide), and/or Au-based or Ag-based alloys that may be easily fused as a solid coating upon treatment (e.g., backing) of the transferred pattern.

Another advantage of the present invention is that nano-imprinted devices which include long-range ordered periodic array of nano-features are relatively low cost while allowing for a relatively high manufacturing throughput. Advantageously, once a reliable nano-imprint master pattern is generated, many devices may be easily manufactured according to a simple and repeatable nano-imprinting process.

Figure 19:
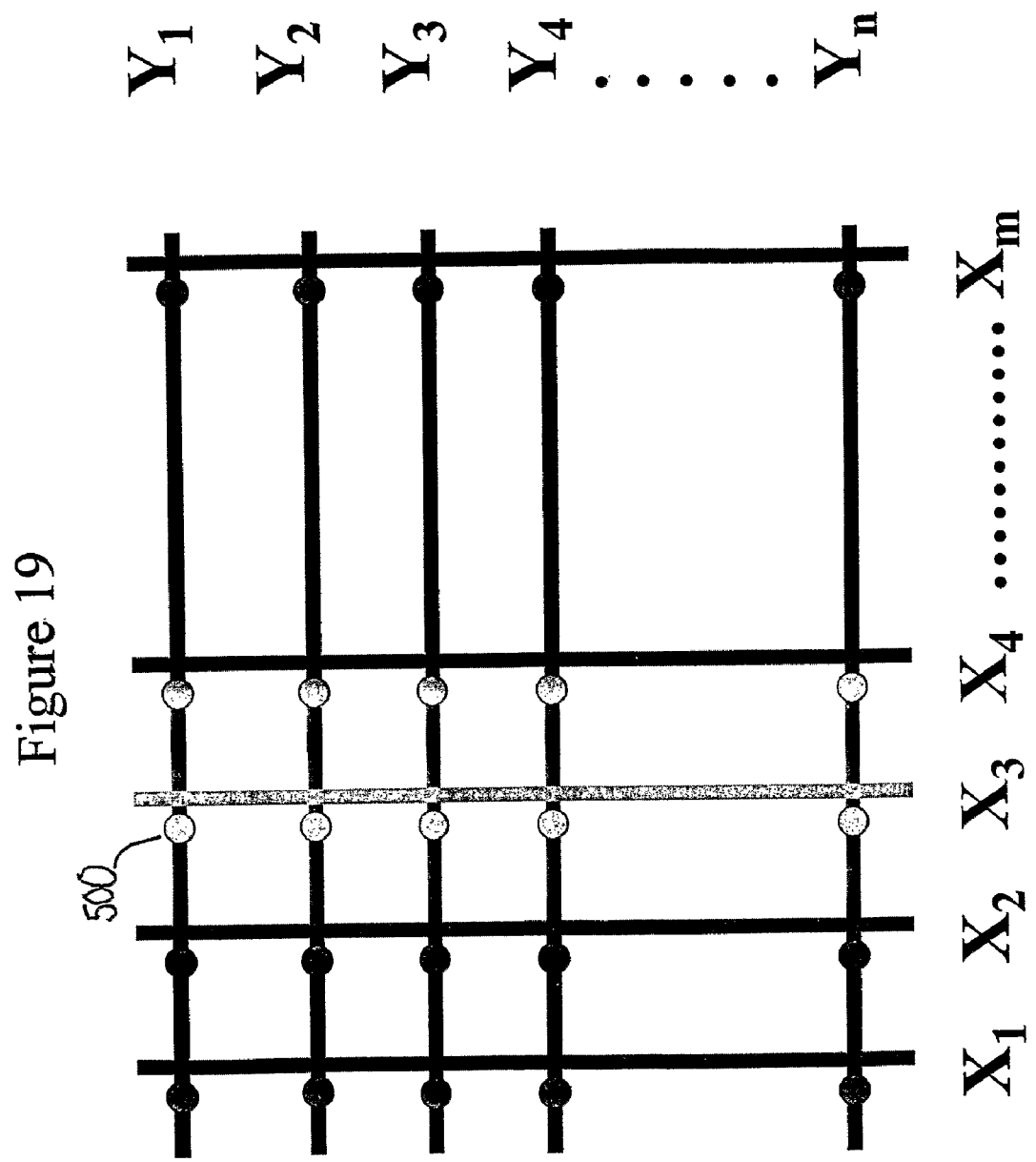
FIG. 19 illustrates a X-Y addressable switch, memory or logic device comprising a long-range ordered periodic array of nano-features, according to an embodiment of the present invention.

FIG. 19 illustrates a X-Y addressable device (e.g., a switch, memory or logic device) comprising a long-range ordered periodic array of nano-features, according to an embodiment of the present invention. According to an embodiment of the present invention, long-range ordered periodic arrays of memory elements 500 may be placed between X-Y address lines ($X_1$ through $X_m$ and $Y_1$ through $Y_n$) at or near the crosspoints, as illustrated in FIG. 19. Optionally, insulators and/or other structural elements, such as, for example, heaters or transistor switches, may also be provided at or near each cross-point. Addressable devices comprising long-range ordered periodic arrays of nano-features include flash memory (e.g., utilizing charge storage floating gate), resistance random access memory (RRAM), phase-change random access memory (PRAM), magnetic random access memory (MRAM), transistor arrays, single electron transistor arrays, quantum computing element arrays, etc.

Figure 20A:
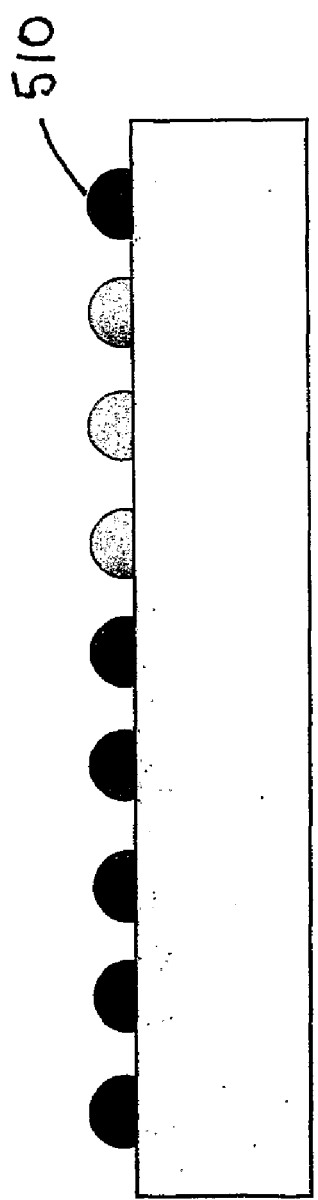
FIGS. 20A and 20B illustrate exemplary phase change memory devices including a long-range ordered periodic array of nano-features, according to an embodiment of the present invention.
Figure 20B:
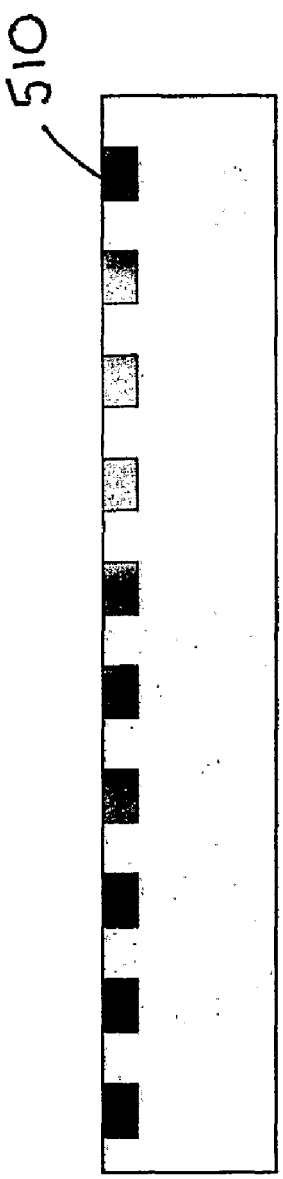

An exemplary nano-feature array for use in a matrix addressable phase change random access memory (PRAM) device is illustrated in FIG. 20. Each of the phase-change memory elements 510 (e.g., Ge—Sb—Te alloy nano-features) located at or near the cross-points of the X-Y addressable configuration (the conductor line arrays are not shown in the figure), experience amorphous versus crystalline phase changes, with significant changes in electrical resistance. The activation (writing) of each memory element 510 is performed by either laser pulse or electrical current pulse. The reading of the memory bit status (e.g., 1 or 0) is performed, e.g., by electrical measurement using a lower-intensity voltage or current pulse.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A nanoscale patterning method, comprising:
   disposing a material to be patterned on a substrate, wherein the material comprises an ordered region of periodically arranged non-features; and
   moving a heat source relative to the material at a non-uniform sweeping speed to induce an expansion of the ordered region, thereby patterning the material with a long-range ordered periodic array of nano-features.

2. A nanoscale electrochemical patterning method, comprising the steps of:
   disposing an anode material to be patterned on a substrate;
   moving a narrow area cathode actuator in a sweeping motion along the anode material to produce a plurality of periodically aligned shallow seed anodization spots in the anode material; and
   exposing the anode material to a broad area cathode actuator to propagate the shallow seed anodization spots deeper into the substrate to form a long-range periodic array of deep nano-pores.

3. A nanoscale patterning method, comprising:
   applying a layer of diblock copolymer solution to a substrate, wherein the diblock copolymer solution comprises a pair of phase-separated, self-assembling polymers diluted in a solvent; and
   causing a temperature gradient from a stationary heat source arranged at an edge of the diblock copolymer layer to evaporate the solvent, thereby allowing the phase-separated polymers to assemble into a long-range ordered periodic array of nano-rods.

4. A nanoscale electrochemical patterning method, comprising:
   disposing an anode material to be patterned on a substrate;
   laterally moving a cathode actuator relative to the anode material at a substantially constant sweeping speed to induce a propagating nucleation and growth of periodically aligned nano-pores; and
   forming a long-range ordered periodic array of nano-pores in the anode material.

5. A nanoscale electrochemical patterning method, comprising:
   disposing an anode material to be patterned on a substrate;
   circularly moving a cathode actuator relative to the anode material at a constant sweeping speed to induce a propagating nucleation and growth of periodically aligned nano-pores; and
   forming a long-range ordered periodic array of nano-pores in the anode material.

6. A nanoscale electrochemical patterning method, comprising:
   disposing an anode material to be patterned on a substrate;
   sequentially activating a series of stationary cathode actuators arranged above the anode material to be patterned to induce a propagating nucleation and growth of periodically aligned nano-pores; and
   forming a long-range ordered periodic array of nano-pores in the anode material.

7. A nanoscale electrochemical patterning method, comprising:
   disposing an anode material to be patterned on a substrate;
   moving a cathode actuator relative to the anode material at a substantially non-uniform sweeping speed to induce a propagating nucleation and growth of periodically aligned nano-pores; and
   forming a long-range ordered periodic array of nano-pores in the anode material.

8. A nanoscale patterning method, comprising:
   coating a colloidal solution on a substrate, wherein the colloidal solution comprises a plurality of self-assembling nano-particles and a surfactant diluted in a solvent; and
   moving a heat source relative to the colloidal solution at a substantially non-uniform sweeping speed to evaporate the solvent, thereby allowing the plurality of self-assembling nano-particles to assemble into a long-range ordered periodic array of nano-features.

* * * * *